US012757210B2

(12) United States Patent
Bae et al.

(10) Patent No.: US 12,757,210 B2
(45) Date of Patent: Oct. 6, 2026

(54) METHOD AND APPARATUS FOR RETRANSMITTING SYNCHRONOUS AND ASYNCHRONOUS DATA IN WIRELESS COMMUNICATION SYSTEM

(71) Applicant: Samsung Electronics Co., Ltd., Suwon-si (KR)

(72) Inventors: Taehan Bae, Suwon-si (KR); Jeongho Yeo, Suwon-si (KR); Sungjin Park, Suwon-si (KR); Jinyoung Oh, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 17/789,666

(22) PCT Filed: Jan. 6, 2021

(86) PCT No.: PCT/KR2021/000108
§ 371 (c)(1),
(2) Date: Jun. 28, 2022

(87) PCT Pub. No.: WO2021/141371
PCT Pub. Date: Jul. 15, 2021

(65) Prior Publication Data

US 2023/0092491 A1 Mar. 23, 2023

(30) Foreign Application Priority Data

Jan. 6, 2020 (KR) ........................ 10-2020-0001425

(51) Int. Cl.
*H04W 72/23* (2023.01)
*H04L 1/1812* (2023.01)
*H04L 1/1829* (2023.01)

(52) U.S. Cl.
CPC ........... *H04W 72/23* (2023.01); *H04L 1/1812* (2013.01); *H04L 1/1861* (2013.01)

(58) Field of Classification Search
CPC ..................................................... H04W 72/23
See application file for complete search history.

(56) References Cited

U.S. PATENT DOCUMENTS

2010/0260130 A1 10/2010 Earnshaw et al.
2017/0332419 A1 11/2017 Kim et al.
(Continued)

FOREIGN PATENT DOCUMENTS

CN 110351016 A 10/2019
KR 10-2021-0020628 A 2/2021
(Continued)

OTHER PUBLICATIONS

Extended European Search Report dated Nov. 8, 2022, issued in European Patent Application No. 21738895.8.
(Continued)

*Primary Examiner* — Jackie Zuniga Abad
(74) *Attorney, Agent, or Firm* — Jefferson IP Law, LLP

(57) ABSTRACT

The present disclosure relates to a communication technique, which is a convergence of IoT technology and 5G communication system for supporting higher data transmission rate beyond 4G system, and a system for same. The present invention can be applied to smart services (e.g. smart homes, smart buildings, smart cities, smart cars or connected cars, health care, digital education, retail businesses, security-and safety-related services, etc.) on the basis of 5G communication technology and IoT-related technology. The present disclosure discloses a method and apparatus for retransmitting synchronous and asynchronous data, and a method and apparatus for recognizing and sharing a HARQ process ID between a terminal and a base station.

12 Claims, 20 Drawing Sheets

(56) References Cited

U.S. PATENT DOCUMENTS

| | | | | |
|---|---|---|---|---|
| 2018/0146439 | A1* | 5/2018 | Kim | H04W 52/325 |
| 2018/0324772 | A1 | 11/2018 | Babaei et al. | |
| 2019/0215104 | A1* | 7/2019 | Salem | H04W 80/02 |
| 2019/0254067 | A1* | 8/2019 | Al-Imari | H04W 72/1268 |
| 2020/0235891 | A1* | 7/2020 | Lei | H04L 5/001 |
| 2020/0374748 | A1 | 11/2020 | Ahn et al. | |
| 2021/0050956 | A1 | 2/2021 | Yeo et al. | |
| 2022/0029746 | A1* | 1/2022 | Noh | H04L 1/1812 |
| 2022/0201757 | A1* | 6/2022 | Cruz | H04L 1/1896 |

FOREIGN PATENT DOCUMENTS

| | | | |
|---|---|---|---|
| WO | 2019/027285 | A1 | 2/2019 |
| WO | 2019/033389 | A1 | 2/2019 |

OTHER PUBLICATIONS

Korean Office Action with English translation dated Oct. 23, 2025; Korean Appln. No. 10-2020-0001425.

* cited by examiner

| SCS | Bandwidth |
|---|---|
| 15 kHz | 3.6 MHz |
| 30 kHz | 7.2 MHz |
| 120 kHz | 28.8 MHz |
| 240 kHz | 57.6 MHz |

| Orbit type | Height | Period |
|---|---|---|
| LEO | 500~1000 ㎞ | 90~120 min |
| MEO | 5000~15000 ㎞ | Approx 6 hours |
| GEO | Approx 36,000 ㎞ | Approx 24 hours |

METHOD AND APPARATUS FOR RETRANSMITTING SYNCHRONOUS AND ASYNCHRONOUS DATA IN WIRELESS COMMUNICATION SYSTEM

TECHNICAL FIELD

The disclosure relates to a wireless communication system, and to a process of transmitting and retransmitting data between a terminal and a base station in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post Long Term Evolution (Post LTE)" system. The 5G communication system defined by 3GPP is called a "New Radio (NR) system".

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques have been discussed in 5G communication systems and applied to the NR system.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the recent development of communication systems, various research for enhancing data transmission and retransmission procedures has been conducted.

DISCLOSURE OF INVENTION

Technical Problem

In a wireless communication system, for example, an LTE or NR system, when data is transmitted from a transmission terminal to a reception terminal, the transmission terminal and the reception terminal need to understand a hybrid automatic repeat requestion (HARQ) process ID of the corresponding data. The HARQ process ID is information required for the reception terminal to perform data decoding in data initial transmission and retransmission, and may be indicated by control information or determined by a slot number.

When a delay time from data transmission is reception is long, a large number of HARQ process IDs are required to enable consecutive transmission of different data. When there are a large number of HARQ process IDs, control information requires a large number of bits to indicate one of a large number of HARQ process IDs during data transmission. In addition, when HARQ process IDs are distinguished by slot numbers over time, a problem of increasing a delay time required for retransmission of data corresponding to a specific HARQ process ID may occur.

Solution to Problem

According to an embodiment for solving the above-described technical problem, a method of a terminal includes: receiving, from a base station, downlink control information (DCI) which schedules data transmission; determining a hybrid automatic repeat request (HARQ) process corresponding to the data transmission, based on an indicator included in the DCI and a slot index of a slot in which the DCI is received; and transmitting, to the base station, a response to the data transmission according to the HARQ process.

According to an embodiment for solving the above-described technical problem, a method of a base station includes: transmitting, to a terminal, downlink control information (DCI) which schedules data transmission; and receiving, from the terminal, a response to the data transmission according to a hybrid automatic repeat request (HARQ) process based on an indicator included in the DCI and a slot index of a slot in which the DCI is transmitted.

According to an embodiment for solving the above-described technical problem, a terminal includes a transceiver configured to transmit and receive a signal; and a controller connected to the transceiver, wherein the controller is configured to receive, from a base station, downlink control information (DCI) which schedules data transmission, determine a hybrid automatic repeat request (HARQ) process corresponding to the data transmission, based on an indicator included in the DCI and a slot index of a slot in which the DCI is received, and transmit, to the base station, a response to the data transmission according to the HARQ process.

According to an embodiment for solving the above-described technical problem, a base station includes: a transceiver configured to transmit and receive a signal; and a controller connected to the transceiver, wherein the controller is further configured to transmit, to a terminal, downlink control information (DCI) which schedules data transmission, and receive a response to the data transmission according to a hybrid automatic repeat request (HARQ) process based on an indicator included in the DCI and a slot index of a slot in which the DCI is transmitted.

Advantageous Effects of Invention

Various embodiments of the disclosure provide a method and apparatus for understanding a HARQ process ID of data transmitted between a transmission terminal and a reception terminal, whereby, specifically, when a large number of HARQ process IDs are utilized, information or a value for identifying HARQ process IDs between the transmission terminal and the reception terminal can be efficiently shared. Specifically, by combining synchronous transmission and asynchronous transmission, the HARQ process ID may be directly transferred from the transmission terminal to the reception terminal, or may be derived from other information (for example, a slot number), and thus, transmission and retransmission can be efficiently performed.

MODE FOR THE INVENTION

Figure 1:
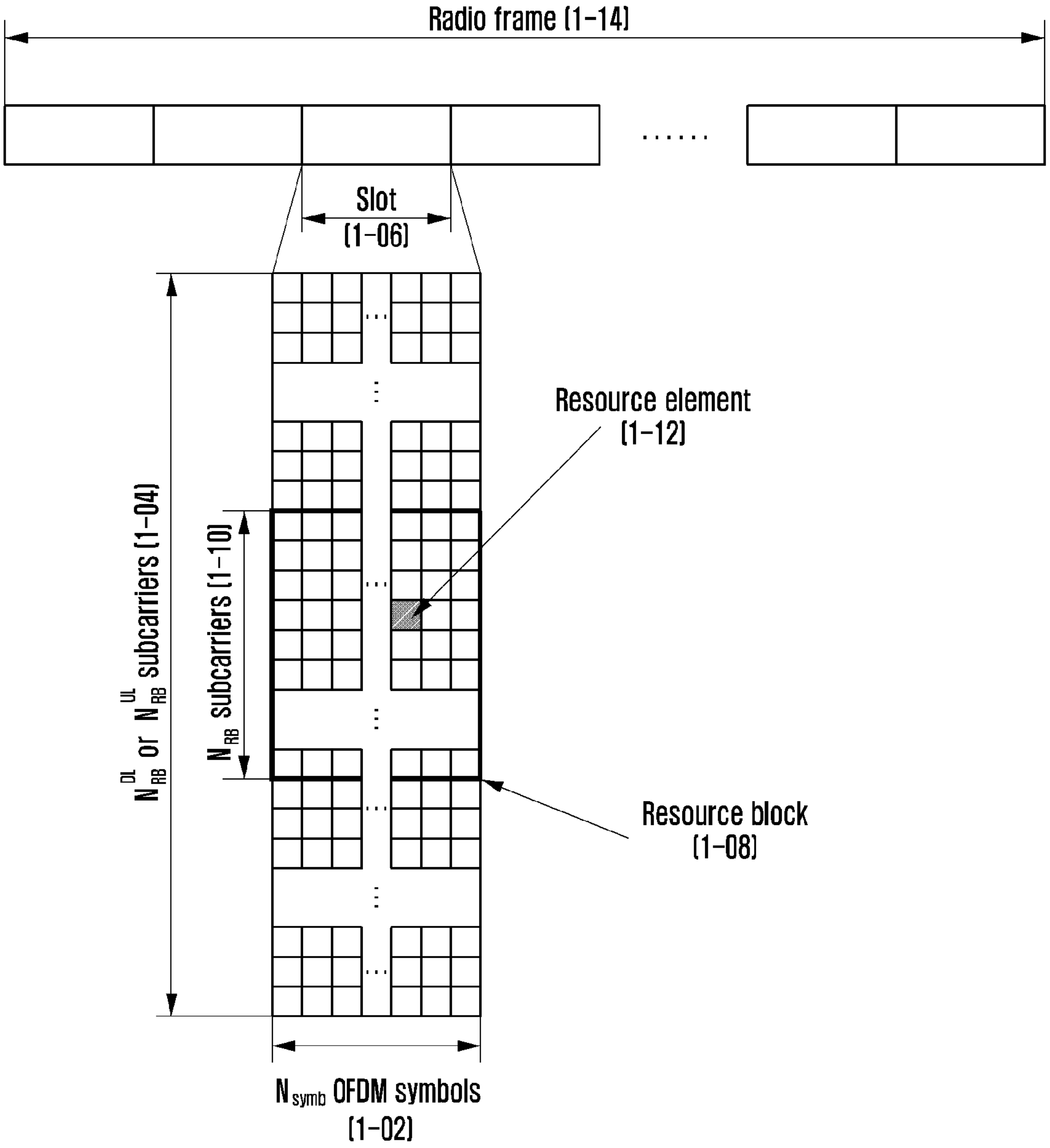
FIG. 1 illustrates a basic structure of a time-frequency domain that is a radio resource area in which data or a control channel is transmitted in a downlink or an uplink in an NR system related to the disclosure.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the “unit” refers to a software element or a hardware element, such as a Field Programmable Gate Array (FPGA) or an Application Specific Integrated Circuit (ASIC), which performs a predetermined function. However, the “unit” does not always have a meaning limited to software or hardware. The “unit” may be constructed either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the “unit” may be either combined into a smaller number of elements, or a “unit”, or divided into a larger number of elements, or a “unit”. Moreover, the elements and “units” or may be implemented to reproduce one or more CPUs within a device or a security multimedia card.

Wireless communication systems have expanded beyond the original role of providing a voice-oriented service and have evolved into wideband wireless communication systems that provide a high-speed and high-quality packet data service according to, for example, communication standards such as high-speed packet access (HSPA), LTE or evolved universal terrestrial radio access (E-UTRA), and LTE-Advanced (LTE-A) of 3GPP, high-rate packet data (HRPD) and a ultra-mobile broadband (UMB) of 3GPP2, and 802.16e of IEEE. In addition, 5G or new radio (NR) communication standards have been established as 5G wireless communication systems.

As a representative example of the broadband wireless communication systems, in the NR system, an orthogonal frequency-division multiplexing (OFDM) scheme has been adopted for a downlink (DL) and an uplink (UL). More specifically, a cycle-prefix OFDM (CP-OFDM) has been adopted for the downlink, and both a discrete Fourier transform spreading OFDM (DFT-S-OFDM) and the CP-OFDM have been adopted for the uplink. The uplink indicates a radio link through which data or a control signal is transmitted from a terminal (a user equipment (UE) or a mobile station (MS)) to a base station (a Node B, an evolved Node B (eNB), a next generation node B (gNB), or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

In a NR system that is new 5G communication, various services on time and frequency resources have been designed to be freely multiplexed, and accordingly, waveform/numerology, a reference signal and the like may be dynamically or freely allocated according to a need of the corresponding services. In order to provide an optimal service to a terminal in wireless communication, it is important to transmit optimized data through measurement of the quality and an interference amount of a channel, and accordingly, it is essential to accurately measure a channel state. However, unlike the 4G communication in which channel and interference characteristics do not greatly change depending on frequency resources, the 5G channel has channel and interference characteristics greatly changing depending on services, and thus, there is a need to support a subset of frequency resource group (FRG) that can measure the channel and interference characteristics separately.

In the NR system, the type of supported service may be classified into categories such as enhanced mobile broadband (eMBB), massive machine type communications (mMTC), ultra-reliable and low-latency communications (URLLC) or the like. eMBB may be considered as a service aiming at a high speed transmission of high-capacity data, mMTC may be considered as a service aiming at terminal power minimization and an access of multiple terminals, and URLLC may be considered as a service aiming at high reliability and low latency. Different requirements may be applied depending on the type of service applied to the terminal.

In addition, the NR system adopts a hybrid automatic repeat request (HARQ) scheme of retransmitting corresponding data in a physical layer when a decoding failure occurs in initial transmission. The HARQ scheme corresponds to a scheme in which when a receiver fails to precisely decode data, the receiver transmits information (negative acknowledgement (NACK)) indicating the decoding failure to the transmitter so that the transmitter can retransmit the corresponding data in the physical layer. The receiver combines the data retransmitted by the transmitter with the data, the decoding of which has previously failed, thereby increasing data reception performance. Furthermore, when the receiver precisely decodes data, the receiver transmits information (acknowledgement (ACK)) indicating a decoding success to the transmitter so that the transmitter can transmit new data.

As described above, in a communication system, multiple services may be provided to a user, and in order to provide such multiple services to a user, there is a need for a method capable of providing each service suitable for characteristics within the same time interval and an apparatus using the same.

FIG. 1 illustrates a basic structure of a time-frequency domain that is a radio resource area in which data or a control channel is transmitted in a downlink or an uplink in an NR system related to the disclosure.

Referring to FIG. 1, a transverse axis indicates a time domain and a longitudinal axis indicates a frequency domain. A minimum transmission unit in the time domain is an OFDM symbol, $N_{symb}$ OFDM symbols 1-02 gather to configure one slot 1-06. The length of a subframe is defined as 1.0 ms, and a radio frame 1-14 is defined as 10 ms. A minimum transmission unit in the frequency domain is a subcarrier, and the bandwidth of the entire system transmission bandwidth is configured with a total of $N_{BW}$ subcarriers 104.

In the time-frequency domain, a basic unit of a resource is a resource element (RE) 1-12 and may be indicated as an OFDM symbol index and a subcarrier index. A resource block (RB) 1-08 (or physical resource block (PRB)) may be defined as $N^{symb}$ consecutive OFDM symbols 1-02 in the time domain and $N_{RB}$ consecutive subcarriers 1-10 in the frequency domain. Accordingly, one RB 1-08 may include $N_{symb} \times N_{RB}$ REs 1-12. In general, a minimum transmission unit of data is an RB. In the NR system, in general, $N_{symb}=14$, $N_{RB}=12$, and $N_{BW}$ and $N_{RB}$ may be proportional to the bandwidth of a system transmission band. A data rate increases in proportion to the number of RBs scheduled in a terminal.

In a case of a frequency division duplex (FDD) system that divides and operates a downlink and an uplink by a frequency, a downlink transmission bandwidth and an uplink transmission bandwidth may be different from each other. The channel bandwidth represents an RF bandwidth corresponding to a system transmission bandwidth. Tables 1 (configuration of frequency range 1 (FR1)) and 2 (configuration of FR2)) show a part of the correspondence between the system transmission bandwidth, subcarrier spacing, and channel bandwidth defined in the NR system in a frequency band lower than 6 GHz and a frequency band higher than 6 GHz, respectively. For example, an NR system having a 100 MHz channel bandwidth with 30 kHz subcarrier spacing has a transmission bandwidth including 273 RBs. In the following description, N/A may be a bandwidth-subcarrier combination not supported in the NR system.

TABLE 1

| | | Channel bandwidth $BW_{Channel}$ [MHz] | | | | | |
|---|---|---|---|---|---|---|---|
| | Subcarrier spacing | 5 MHz | 10 MHz | 20 MHz | 50 MHz | 80 MHz | 100 MHz |
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth $BW_{Channel}$ [MHz] | Subcarrier spacing | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, the frequency range may be divided into FR1 and FR2 and defined, as shown in Table 3 below

TABLE 3

| Frequency range designation | Corresponding frequency range |
|---|---|
| FR1 | 450 MHz-7125 MHz |
| FR2 | 24250 MHz-52600 MHz |

In the above description, the ranges of FR1 and FR2 may be changed and applied differently. For example, a frequency range of FR1 may be changed to 450 MHz-6000 MHz and applied.

In the NR system, scheduling information on downlink data or uplink data is transferred from a base station to a terminal through downlink control information (DCI). The DCI is defined according to various formats, and may indicate whether the information is scheduling information (UL grant) on uplink data or scheduling information (DL grant) on downlink data depending on each format, whether the information is compact DCI having a small size of control information, whether spatial multiplexing using multiple antennas is applied, whether the information is DCI for power control, etc. For example, DCI format 1-1 corresponding to scheduling control information (DL grant) on downlink data may include at least one of the following pieces of control information.

- Carrier indicator: indicates a frequency carrier on which transmission is performed
- DCI format identifier: indicates whether the corresponding DCI is for downlink or uplink
- Bandwidth part (BWP) indicator: indicates a BWP in which transmission is performed
- Frequency domain resource assignment: indicates an RB of a frequency domain allocated for data transmission, wherein a represented resource is determined according to a system bandwidth and a resource allocation type
- Time domain resource assignment: indicates an OFDM symbol of a slot, in which a data-related channel is transmitted
- VRB-to-PRB mapping: indicates a scheme of mapping a virtual RB (VRB) index and a physical RB (PRB)
- Modulation and coding scheme (MCS): indicates a modulation scheme used for data transmission, and the size of a transport block corresponding to data to be transmitted HARQ processor number indicates a process number of HARQ New data indicator: indicates whether transmission is HARQ initial transmission or retransmission Redundancy version: indicates a redundancy version of HARQ Transmit power control (TPC) command for physical uplink control channel (PUCCH): indicates a transmit power control command for a PUCCH corresponding to an uplink control channel In the above description, in a case of data transmission through a physical downlink shared channel (PDSCH) or a physical uplink shared channel (PUSCH), time domain resource assignment (TDRA) may be transferred by information on a slot in which the PDSCH/PUSCH is transmitted, a start symbol location S in the corresponding slot, and the number L of symbols to which the PDSCH/IPUSCH is mapped. In the above description, S may be a relative location from the start of the slot, L may be the number of consecutive symbols, and S and L may be determined from a start and length indicator value (SLIV) defined as below.

```
if (L−1)≤then
    SLIV = 14*(L−1)+S
else
    SLIV = 14*(14−L+1)+(14−1−S)
where 0<L≤14−S
```

In the NR system, the terminal may receive information on an SLIV value, a PDSCH/PUSCH mapping type, and a slot to which the PDSCH/PUSCH is transmitted in one row through radio resource control (RRC) configuration (for example, the information may be configured in the form of a table). Thereafter, in time domain resource allocation of the DCI, by indicating an index value in the configured table, the base station may transmit, to the terminal, information on the SLIV value, the PDSCH/PUSCH mapping type, and the slot to which the PDSCH/PUSCH is transmitted.

In the NR system, as a PDSCH mapping type, type A and type B are defined. In PDSCH mapping type A, the first symbol of demodulation reference signal (DMRS) symbols is located in the second or third OFDM symbol of the slot. In PDSCH mapping type B, the first symbol of the DMRS symbols of the first OFDM symbol in a time domain resource allocated to PUSCH transmission is located.

The DCI may be transmitted on a physical downlink control channel (PDCCH) corresponding to a downlink physical control channel, through a channel coding and modulation process. In the disclosure, when control information is transmitted through the PDCCH or the PUCCH, it may be represented that the PDCCH or the PUCCH is transmitted. Similarly, when data is transmitted through the PUSCH or the PDSCH, it may be represented that the PUSCH or the PDSCH is transmitted.

In general, the DCI is independently scrambled with a specific radio network temporary identifier (RNTI) (or a terminal identifier) with respect to each terminal, and after cyclic redundancy check (CRC) is added to the DCI and goes through channel coding, the DCI is configured with each independent PDCCH and transmitted. The PDCCH is mapped to a control resource set (CORESET) configured for the terminal, and transmitted.

Downlink data may be transmitted on a PDSCH corresponding to a physical channel for downlink data transmission. The PDSCH may be transmitted after the control channel transmission period, and scheduling information such as a specific mapping location and a modulation method in the frequency range is determined based on the DCI transmitted through the PDCCH.

Among the control information constituting the DCI, the base station notifies the terminal of a modulation scheme applied to the PDSCH to be transmitted and the size (a transport block size (TBS)) of data to be transmitted through the modulation and coding scheme (MCS). In an embodiment, the MCS may be configured with 5 bits or more or fewer bits. The TBS corresponds to the size before channel coding for error correction is applied to data (transport block, TB) to be transmitted by the base station.

In the disclosure, a transport block (TB) may include a medium access control (MAC) header, a MAC control element (CE), one or more MAC service data units (SDUs), and padding bits. Alternatively, the TB may indicate a data unit or MAC protocol data unit (PDU) transferred or delivered from the MAC layer to the physical layer.

Modulation methods supported in the NR system are quadrature phase shift keying (QPSK), 16 quadrature amplitude modulation (QAM), 64QAM, and 256QAM, and each modulation order (Qm) corresponds to 2, 4, 6, and 8. That is, 2 bits per symbol in the case of QPSK modulation, 4 bits per symbol in the case of 16QAM modulation, 6 bits per symbol in the case of 64QAM modulation, and 8 bits per symbol in the case of 256QAM modulation may be transmitted.

Figure 2A:
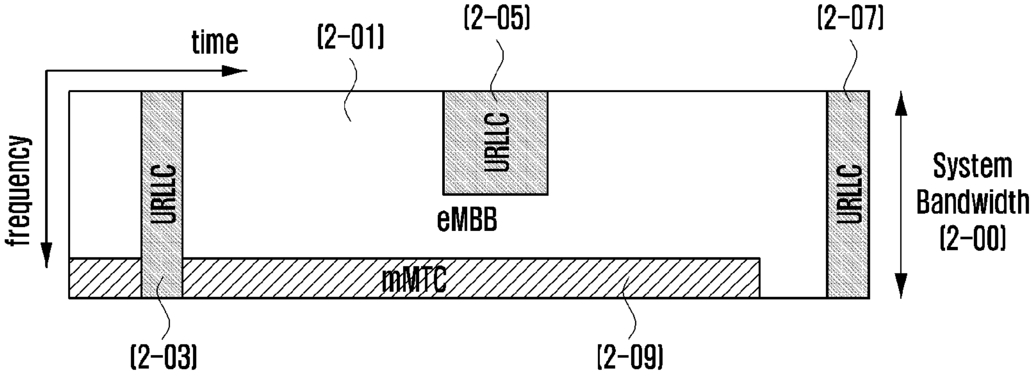
FIG. 2A illustrates assignment of data for an enhanced mobile broadband (eMBB), ultra-reliable and low-latency (URLLC), and massive machine type communication (mMTC) corresponding to services considered in a 5G or NR system relate to the disclosure.
Figure 2B:
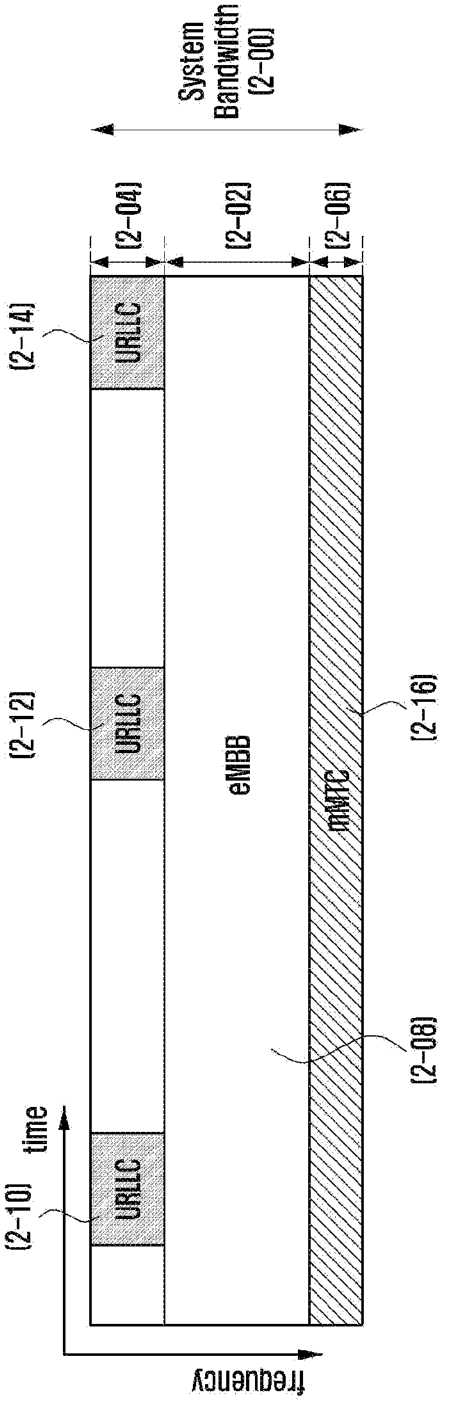
FIG. 2B illustrates assignment of data for an eMBB, URLLC, and mMTC corresponding to services considered in a 5G or NR system relate to the disclosure.

FIGS. 2A and 2B illustrate assignment of data for an eMBB, URLLC and mMTC, which are services taken into consideration in a 5G or NR system related to the disclosure, in frequency-time resources. Referring to FIGS. 2A and 2B, a scheme of assigning frequency and time resources for information transmission in each system may be identified.

FIG. 2A illustrates assignment of data for an eMBB, URLLC, and mMTC in the entire system frequency band 2-00. If URLLC data 2-03, 2-05, and 2-07 are generated and need to be transmitted while eMBB 2-01 and mMTC 2-09 are assigned and transmitted in a specific frequency band, parts to which eMBB 2-01 and mMTC 2-09 have already been assigned may be empty or may not be transmitted, and the URLLC data 2-03, 2-05, and 2-07 may be transmitted. Among the services above, URLLC requires reduction in latency, and thus, the URLLC data may be assigned (2-03, 2-05, and 2-07) to a part of the resource 2-01, to which the eMBB has been assigned, and transmitted. If the URLLC is additionally assigned and transmitted in the resource to which eMBB has been assigned, eMBB data may not be transmitted in a redundant frequency-time resource. Accordingly, the transmission performance of the eMBB data may be reduced. That is, in this case, an eMBB data transmission failure may occur due to the URLLC assignment.

Figure 3:
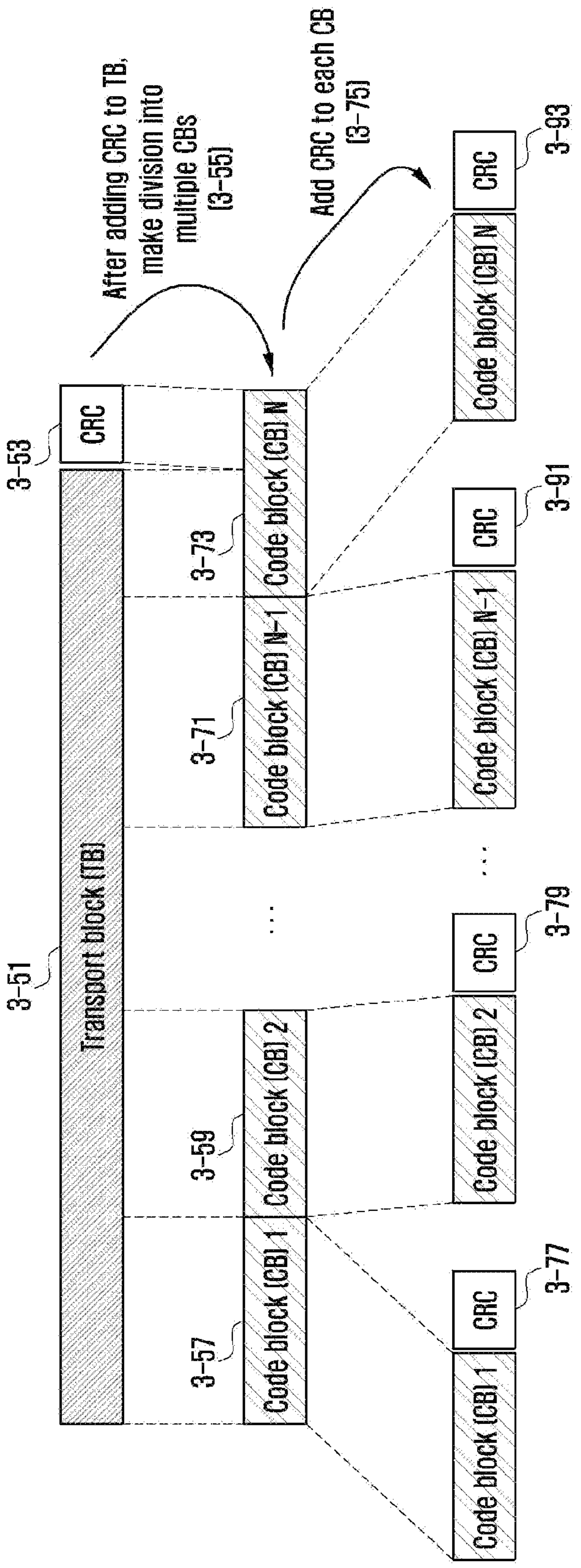
FIG. 3 illustrates a process in which one transport block (TB) is divided into multiple code blocks and a cyclic redundancy check (CRC) is added thereto, in relation to the disclosure.

In FIG. 2B, the entire system frequency band 2-00 may be divided and used to transmit services and data in each of subbands 2-02, 2-04, and 2-06. Information related to the subband configuration may be pre-determined and may be transmitted from base station to a terminal through higher-layer signaling. Alternatively, the information related to the subbands may be randomly divided by a base station or a network node, and services may be provided to a terminal without transmitting separate subband configuration information. FIG. 3 illustrates use of the subband 2-02 for eMBB data transmission 2-08, the use of the subband 2-04 for URLLC data transmission 2-10, 2-12, and 2-14, and the use of the subband 2-06 for mMTC data transmission 2-16.

In overall embodiments, the length of a transmission time interval (TTI) used for URLLC transmission may be shorter than the length of a TTI used for eMBB or mMTC transmission. Furthermore, a response of information related to URLLC may be transmitted faster than eMBB or mMTC. Accordingly, information can be transmitted and received with low latency.

The structure of a physical layer channel used for each type in order to transmit the three types of services or data may be different. For example, according to each service, at least one of the length of a transmission time interval (TTI), an assignment unit of a frequency resource, the structure of a control channel, and a mapping method of data may be different.

The three types of services and the three types of data have been illustrated above, but more types of services and corresponding data may be present. Even in this case, the contents of this disclosure may be applied.

In order to describe a method and apparatus proposed in an embodiment, terms "physical channel" and "signal" in an NR system may be used. However, the contents of the disclosure may be applied to wireless communication systems other than NR systems.

Hereinafter, embodiments of the disclosure will be described in detail with the accompanying drawings.

A sidelink (SL) refers to a signal transmission/reception path between terminals, which may be interchangeably used with a PC5 interface. Hereinafter, a base station is an entity that performs resource allocation of a terminal, and may be a base station supporting both vehicular-to-everything (V2X) communication and general cellular communication, or a base station supporting only V2X communication. That is, the base station may denote an NR base station (gNB), an LTE base station (eNB), or a road site unit (RSU) (or fixed station). The terminal may include a general user equipment, a mobile station, as well as a vehicle supporting vehicle-to-vehicle communication (vehicular-to-vehicular, V2V), a vehicle supporting vehicle-to-pedestrian (V2P), pedestrian handsets (e.g., smartphones), a vehicle supporting vehicular-to-network communication (V2N), a vehicle supporting vehicle-to-infrastructure communication (V2I), an RSU equipped with a terminal function, an RSU equipped with a base station function, an RSU equipped with a part of the base station function and a part of the terminal function, or the like. In addition, although embodiments of the disclosure will be described below using the NR system as an example, embodiments of the disclosure may be applied to other communication systems having similar technical backgrounds or channel types. In addition, the embodiments may be applied to other communication systems through some modifications within a range that does not significantly depart from the scope of the disclosure, as determined by those skilled in the art.

In addition, as described above, hereinafter, the terms "physical channel" and "signal" in the conventional art may be used interchangeably with data or a control signal. For example, a PDSCH is a physical channel through which data is transmitted, but in the disclosure, the PDSCH may be referred to as data.

Hereinafter, in the disclosure, higher-layer signaling is a signal transmission method in which a signal is transmitted from a base station to a terminal using a downlink data channel of a physical layer, or a signal transmission method in which a signal is transmitted from a terminal to a base station using an uplink data channel of a physical layer, and the higher signaling may be referred to as RRC signaling or an MAC control element.

The following embodiment provides a method and an apparatus for performing transmission or reception of HARQ-ACK feedback for data transmission between a base station and a terminal or between terminals. The embodiment may be a case where the feedback is transmitted from one terminal to multiple terminals, or a case where the feedback is transmitted from one terminal to one terminal. Alternatively, the embodiment may be a case where the feedback is transmitted from a base station to a plurality of terminals. However, the disclosure may be applied to various cases without being limited thereto.

FIG. 3 illustrates a process in which one transport block (TB) is divided into multiple code blocks and a CRC is added thereto, in relation to the disclosure.

Referring to FIG. 3, a CRC 3-53 may be added to the last part or the first part of one transport block 3-51 to be transmitted in an uplink or a downlink. The CRC 3-53 may have 16 bits, 24 bits, or a fixed number of bits, or may have a variable number of bits depending on channel conditions, etc., and may be used to determine whether channel coding is successful. The TB 3-51 and a block to which CRC 3-53 is added may be divided into multiple code blocks (CBs) 3-57, 3-59, 3-71, and 3-73 (indicated by reference numeral 3-55). Here, the divided code blocks may have a predetermined maximum size, and in this case, the last code block 3-73 may be smaller in size than those of other code blocks 3-57, 3-59, and 3-71. This is only given as an example, and according to another example, the last code block 3-73 may include a length adjusted to be the same as those of the other code blocks 3-57, 3-59, and 3-71 by inserting zeros, random values, or ones into the last code block 3-73. CRCs 3-57, 3-59, 3-71, and 3-73 may be added to the code blocks 3-77, 3-79, 3-91, and 3-93, respectively (indicated by reference numeral 3-75). The CRC may include 16 bits, 24 bits, or a fixed number of bits, and may be used to determine whether channel coding is successful.

The TB 3-51 and cyclic generator polynomial may be used in order to generate the CRC 3-53, and the cyclic generator polynomial may be defined in various methods. For example, if it is assumed that cyclic generator polynomial gCRC24A(D)=D24+D23+D18+D17+D14+D11+D10+D7+D6+D5+D4+D3+D+1 for a 24-bit CRC, and L=24, with respect to TB data $a_0, a_1, a_2, a_3, \ldots, a_{A-1}$, CRC $p_0, p_1, p_2, p_3, \ldots, p_{L-1}$, may be a value in which the remainder becomes zero by dividing $a_0D^{A+23}+a_1D^{A+22}+\ldots+a_{A-1}D^{24}+p_0D^{23}+p_1D^{22}+\ldots+p_{22}D^1+p_{23}$ by gCRC24A(D), and may determine $p_0, p_1, p_2, p_3, \ldots, p_{L-1}$. In the above example, the CRC length L is assumed to be 24 as an example, but the CRC length L may be determined to have different lengths, such as 12, 16, 24, 32, 40, 48, 64, and the like.

Through this process, the CRC is added to the TB, and the TB having CRC added thereto may be divided into N CBs 3-57, 3-59, 3-71, and 3-73. The CRCs 3-77, 3-79, 3-91, and 3-93 may be added to each of the divided CBs 3-57, 3-59, 3-71, and 3-73 (indicated by reference numeral 3-75). The CRC added to the CB may have a different length than the CRC added to the TB or may use a different cyclic generator polynomial. However, the CRC 3-53 added to the TB and the CRCs 3-77, 3-79, 3-91, and 3-93 added to the code block may be omitted depending on the type of a channel code to be applied to the code block. For example, if low density parity check (LDPC) codes other than turbo codes are applied to code blocks, the CRCs 3-57, 3-59, 3-91, and 3-93 to be inserted for each code block may be omitted.

However, even if the LDPC is applied, the CRCs 3-77, 3-79, 3-91, and 3-93 may be added to the code block as it is. In addition, CRC may be added or omitted even if a polar code is used.

As described above in FIG. 3, the maximum length of one code block is determined according to the type of channel coding applied to a TB to be transmitted, and the TB and the CRC which is added to the TB are divided into code blocks according to the maximum length of the code block.

In the conventional LTE system, the CRC for CB is added to the divided CB, data bits and the CRC of the CB are encoded with a channel code, and thus coded bits are determined and a number of bits, which perform predetermined rate matching to each of coded bits, may be determined.

The size of the TB in the NR system may be calculated through the following stages.

Stage 1: Calculate $$N'_{RE},$$

the number of REs assigned to PDSCH mapping in one PRB in an allocated resource.

$$N'_{RE}$$

may be calculated by $$N_{sc}^{RB} \cdot N_{symb}^{sh} - N_{DMRS}^{PRB} - N_{oh}^{PRB}.$$

Here, $$N_{sc}^{RB}$$

is 12, and $$N_{symb}^{sh}$$

may represent the number of OFDM symbols allocated to the PDSCH.

$$N_{DMRS}^{PRB}$$

is the number of REs in one PRB occupied by DMRSs of the same CDM group.

$$N_{oh}^{PRB}$$

is the number of REs occupied by the overhead in one PRB, which is configured via higher signaling, and may be configured to 0, 6, 12, or 18. Thereafter, $N_{RE}$, the total number of REs, allocated to the PDSCH, may be calculated. $N_{RE}$ is calculated by $$\min(156, N'_{RE}) \cdot n_{PRB},$$

and $n_{PRB}$ denotes the number of PRBs allocated to the terminal.

Stage 2: The number of temporary information bits, $N_{info}$, may be calculated by $N_{RE}$*R*$Q_m$*v. Here, R is a code rate, Qm is a modulation order, and information of the value may be transferred using an MCS bitfield and a table pre-defined in the control information. Also, v is the number of assigned layers. If $N_{info} \leq 3824$, TBS may be calculated through stage 3 as follows. Otherwise, TBS may be calculated through stage 4.

Stage 3:

$$N'_{info}$$

may be calculated by the equation of $$N'_{info} = \max\left(24, 2^n * \left\lfloor \frac{N_{info}}{2^n} \right\rfloor\right)$$

and $n=\max(3, \lfloor \log_2(N_{info}) \rfloor - 6)$. TBS may be determined as a value, which is closest to $$N'_{info}$$

among values equal to or larger than $$N'_{info}$$

in Table 4 below.

TABLE 4

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |

TABLE 4-continued

| Index | TBS |
|---|---|
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Stage 4:

$$N'_{info}$$

may be calculated by the equation of $$N'_{info} = \max\left(3840,\ 2^n \times \text{round}\left(\frac{N_{info} - 24}{2^n}\right)\right)$$

and $n = \lfloor \log_2(N_{info} - 24) \rfloor - 5$. TBS can be determined through a value of $N_{info}'$ and the following pseudo-code 1.

Start of Pseudo-code 1
if $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else if $N'_{info} > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * C * \left\lceil \frac{N'_{info} + 24}{8} \right\rceil - 24$$

end if
end if
End of Pseudo-code 1

In the NR system, if one CB is input to an LDPC encoder, parity bits may be added to the CB and the CB added with the parity bits may be output. In this case, the number of parity bits may differ according to an LDPC base graph. A method for transmitting all parity bits, generated by LDPC coding for a specific input, may be called full buffer rate matching (FBRM), and a method for limiting the number of parity bits that can be transmitted may be called limited buffer rate matching (LBRM). If resources are allocated for data transmission, the output of the LDPC encoder is made into a circular buffer, and bits of the buffer are repeatedly transmitted as many times as the allocated resources, and in this case, the length of the circular buffer may be called Ncb. If the number of bits generated by LDPC coding is N, Ncb is equal to N in the FBRM method. In the LBRM method, $N_{cb}$ denotes $\min(N, N_{ref})$, $N_{ref}$ is given by $$\left\lfloor \frac{TBS_{LBRM}}{C \cdot R_{LBRM}} \right\rfloor,$$

and $R_{LBRM}$ may be determined to be ⅔. In a method for obtaining the TBS described above, $TBS_{LBRM}$ denotes the maximum number of layers supported by a terminal in the corresponding cell, and is assumed to be the maximum modulation order configured for the terminal in the cell, or 64QAM if there is no configured maximum modulation order, the code rate is assumed to be 948/1024 corresponding to the maximum code rate, $N_{RE}$ is assumed to be $156 \cdot n_{PRB}$, and $n_{PRB}$ may be assumed to be $n_{PRB,LBRM}$. $n_{PRB,LBRM}$ may be given as shown in Table 5 below.

TABLE 5

| Maximum number of PRBs across all configured BWPs of a carrier | $n_{PRB,\ LBRM}$ |
|---|---|
| Less than 33 | 32 |
| 33 to 66 | 66 |
| 67 to 107 | 107 |
| 108 to 135 | 135 |
| 136 to 162 | 162 |

TABLE 5-continued

| Maximum number of PRBs across all configured BWPs of a carrier | $n_{PRB,\ LBRM}$ |
|---|---|
| 163 to 217 | 217 |
| Larger than 217 | 273 |

The maximum data rate supported by a terminal in the NR system may be determined through Equation 1 below.

Equation 1

$$\text{data rate (in Mbps)} = 10^{-6}\cdot\sum_{j=1}^{J}\left(v_{layers}^{(j)}\cdot Q_m^{(j)}\cdot f^{(j)}\cdot R_{max}\cdot\frac{N_{PRB}^{BW(j)\mu}\cdot 12}{T_s^{\mu}}\cdot\left(1-OH^{(j)}\right)\right)$$

In Equation 1, J may denote the number of carriers bound by carrier aggregation, Rmax=948/1024, $$v_{Layers}^{(j)}$$

may denote the maximum number of layers, $$Q_m^{(j)}$$

may denote a maximum modulation order, $f^{(j)}$ may denote a scaling index, and μ may denote a subcarrier spacing. The terminal may report one of 1, 0.8, 0.75, and 0.4 values of $f^{(j)}$, and μ may be given as shown in Table 6 below.

TABLE 6

| μ | $\Delta f = 2^{\mu}\cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $$T_s^{\mu}$$

is the average OFDM symbol length, $$T_s^{\mu}$$

may be calculated to be $$\frac{10^{-3}}{14\cdot 2^{\mu}},$$

and $$N_{PRB}^{BW(j),\mu}$$

is the maximum number of RBs in BW (j). $OH^{(j)}$ is an overhead value, and may be given as 0.14 in the downlink and given as 0.18 in the uplink of FR1 (a band equal to or less than 6 GHz), and may be given as 0.08 in the downlink and given as 0.10 in the uplink of FR2 (a band exceeding 6 GHz). Through Equation 1, the maximum data rate in the downlink in a cell having a 100 MHz frequency bandwidth at a 30 kHz subcarrier spacing may be calculated by the following Table 7.

TABLE 7

| $f^{(j)}$ | $v_{Layers}^{(j)}$ | $v_{Layers}^{(j)}$ | Rmax | $N_{PRB}^{BW(j),\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that the terminal can measure in the actual data transmission may be a value obtained by dividing the data amount by a data transmission time. This may be a value obtained by dividing TBS by the TTI length in 1 TB transmission or dividing the sum of TBSs by the TTI length in 2 TB transmission. For example, as shown in Table 5, the maximum actual data rate in downlink in a cell having a 100 MHz frequency bandwidth at a 30 kHz subcarrier spacing may be determined as shown in Table 8 below according to the number of allocated PDSCH symbols.

TABLE 8

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the terminal may be identified through Table 7, and the actual data rate according to the allocated TBS may be identified through Table 8. At this time, the actual data rate may be larger than the maximum data rate depending on scheduling information.

In the wireless communication system, in particular, in the NR system, data rates that a terminal can support may be promised between a base station and a terminal. The data rate may be calculated using the maximum frequency band, the maximum modulation order, the maximum number of layers, and the like, which are supported by the terminal. However, the calculated data rate may be different from a value calculated according to a transport block size (i.e., TBS) and a transmission time interval (TTI) length of a transport block (TB) used for actual data transmission.

Accordingly, a case in which a terminal is allocated with a TBS larger than a value corresponding to a data rate supported by the terminal itself, may occur. In order to prevent the case from occurring, there may be a limitation of the TBS that can be scheduled according to a data rate supported by the terminal.

Because the terminal is generally far from the base station, a signal transmitted from the terminal is received by the base station after a propagation delay. The propagation delay is a value obtained by dividing a path through which radio waves are transmitted from the terminal to the base station by a speed of light, and may generally be a value obtained by dividing a distance from the terminal to the base station by a speed of light. In an embodiment, in a case of a terminal located 100 km away from the base station, a signal transmitted from the terminal is received by the base station after about 0.34 msec. Conversely, the signal transmitted from the base station is also received by the terminal after about 0.34 msec. As described above, an arrival time of a signal transmitted from the terminal to the base station may vary according to the distance between the terminal and the base station. Therefore, when multiple terminals existing at different locations simultaneously transmit signals, arrival times at the base station may all be different. In order to solve such a problem and enable signals transmitted from multiple terminals to simultaneously arrive at the base station, the time for transmitting the uplink signal may be different for each terminal according to the location. In 5G, NR, and LTE systems, this is referred to as timing advance (TA).

Figure 8:
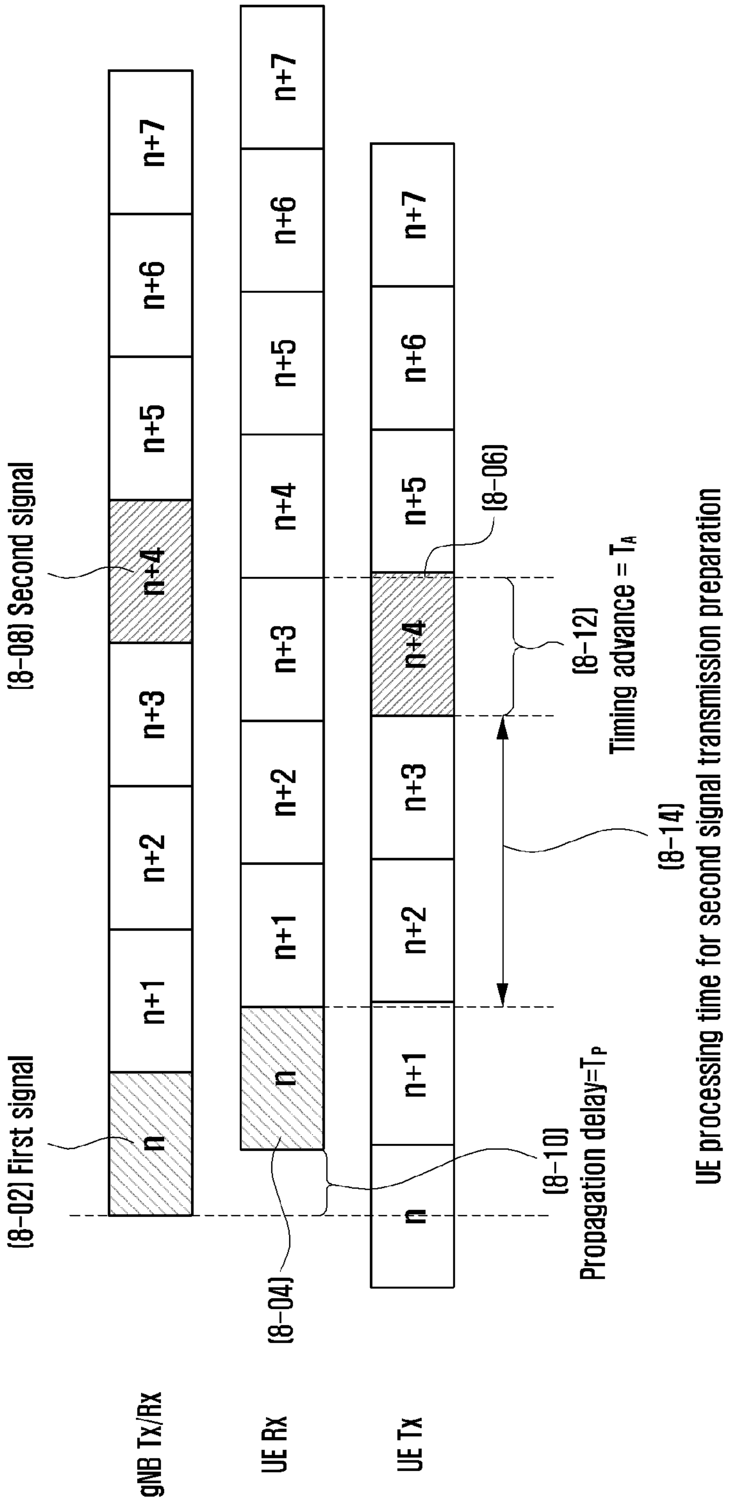
FIG. 8 illustrates a processing time of a terminal according to timing advance when a terminal receives a first signal and transmits a second signal, in relation to the disclosure.

FIG. 8 illustrates a processing time of a terminal according to timing advance when a terminal receives a first signal and transmits a second signal according to a disclosed embodiment.

Hereinafter, a processing time of the terminal according to timing advance will be described in detail. When the base station transmits an uplink scheduling grant or a downlink control signal and data to the terminal in slot n 8-02, the terminal may receive an uplink scheduling grant or a downlink control signal and data in slot n 8-04. In this case, the terminal may receive a signal later by a propagation delay Tp (8-10) than a time in which the base station transmits a signal. In this embodiment, when the terminal receives a first signal 8-02 in slot n 8-04, the terminal transmits a corresponding second signal 8-08 in slot n+4 (8-06). Even when the terminal transmits a signal to the base station, in order for the signal to arrive at the base station at a specific time, at a timing 8-06 advanced by timing advance (TA) 8-12 than slot n+4 of a signal reference received by the terminal, the terminal may transmit HARQ ACK/NACK for uplink data or downlink data. Therefore, in this embodiment, a time in which the terminal may prepare to receive an uplink scheduling grant and transmit uplink data or receive downlink data and transmit HARQ ACK or NACK may be a time remaining after excluding TA from a time corresponding to three slots (8-14).

In order to determine the above-described timing, the base station may calculate an absolute value of the TA of the corresponding terminal. The base station may calculate an absolute value of the TA by adding or subtracting an amount of change in a TA value transmitted through higher-layer signaling thereafter to or from a TA value first delivered to the terminal in a random-access stage when the terminal initially accesses the base station. In the disclosure, the absolute value of the TA may be a value obtained by subtracting a start time of the $n^{th}$ TTI received by the terminal from a start time of the $n^{th}$ TTI transmitted by the terminal.

One of the important criteria of a cellular wireless communication system performance is packet data latency. To this end, in an LTE system, transmission and reception of signals are performed in units of subframes having a transmission time interval (TTI) of 1 ms. The LTE system operating as described above may support a terminal (short-TTI UE) having a TTI shorter than 1 ms. In a 5G or NR system, a TTI may be shorter than 1 ms. A short-TTI UE is suitable for services such as voice over LTE (VoLTE) service and remote control where latency is important. Furthermore, the short-TTI UE becomes a means for realizing cellular-based mission-critical Internet of Things (IoT).

In a 5G or NR system, when the base station transmits a PDSCH including downlink data, DCI for scheduling the PDSCH indicates a K1 value, which is a value corresponding to information on a timing at which the terminal transmits HARQ-ACK information of the PDSCH. When the HARQ-ACK information is not instructed to be transmitted before a symbol L1 including timing advance, the terminal may transmit the HARQ-ACK information to the base station. That is, the HARQ-ACK information may be transmitted from the terminal to the base station at the same timing as or at a timing later than the symbol L1 including timing advance. When the HARQ-ACK information is instructed to be transmitted before the symbol L1 including timing advance, the HARQ-ACK information may not be valid HARQ-ACK information in HARQ-ACK transmission from the terminal to the base station. The symbol L1 may be the first symbol in which a cyclic prefix (CP) starts after $T_{proc,1}$ from the last timing of the PDSCH. $T_{proc,1}$ may be calculated as shown in Equation 2 below.

$$T_{proc,1} = ((N_1 + d_{1,1} + d_{1,2})(2048 + 144)\cdot\kappa 2^{-\mu})\cdot T_C \quad \text{Equation 2}$$

In Equation 2, N1, d1,1, d1,2, κ, μ, and TC may be defined as follows.

- When HARQ-ACK information is transmitted to a PUCCH (an uplink control channel), d1,1=0, and when the HARQ-ACK information is transmitted to a PUSCH (an uplink shared channel, data channel), d1,1=1.
- When the terminal receives multiple activated configuration carriers or carriers, the maximum timing difference between carriers may be reflected in second signal transmission.
- In a case of PDSCH mapping type A, that is, in a case where a first DMRS symbol location is a $3^{rd}$ or $4^{th}$ symbol of the slot, if a location index i of a last symbol of the PDSCH is less than 7, it is defined that d1,2=7−i.

In a case of PDSCH mapping type B, that is, in a case where a first DMRS symbol location is a first symbol of the PDSCH, if a length of the PDSCH is 4 symbols, d1,2=3, and if a length of the PDSCH is 2 symbols, d1,2=3+d, where d is the number of symbols in which the PDSCH and the PDCCH including a control signal for scheduling the corresponding PDSCH overlap.

N1 is defined as in Table 19 according to μ. μ=0, 1, 2, and 3 mean subcarrier spacing of 15 kHz, 30 kHz, 60 kHz, and 120 kHz, respectively.

TABLE 9

| μ | PDSCH decoding time $N_1$ [symbols]<br>No additional PDSCH DM-RS configured | Additional PDSCH DM-RS configured |
|---|---|---|
| 0 | 8 | 13 |
| 1 | 10 | 13 |
| 2 | 17 | 20 |
| 3 | 20 | 24 |

For a value N1 provided in Table 9 above, different values may be used according to UE capability.

$T_c$, $\Delta f_{max}$, $N_f$, $\kappa$, $T_s$, $\Delta f_{ref}$, and $N_{f,ref}$ may be defined as follows:

$$T_c = 1/(\Delta f_{max} \cdot N_f),\ \Delta f_{max} = 480.10^3 \text{ Hz},$$

$$N_f = 4096,\ \kappa = T_s/T_c = 64,\ T_s = 1/(\Delta f_{ref} \cdot N_{f,ref}),$$

$$\Delta f_{ref} = 15.10^3 \text{ Hz},\ N_{f,ref} = 2048.$$

In addition, in the 5G or NR system, when the base station transmits control information including an uplink scheduling grant, the terminal may indicate a K2 value corresponding to timing information that transmits uplink data or a PUSCH.

When the PUSCH is not instructed to be transmitted before symbol L2 including timing advance, the terminal may transmit the PUSCH to the base station. That is, the PUSCH may be transmitted from the terminal to the base station at the same timing as or at a timing later than symbol L2 including timing advance. When the PUSCH is instructed to be transmitted before symbol L2 including timing advance, the terminal may ignore uplink scheduling grant control information from the base station. Symbol L2 may be a first symbol in which a cyclic prefix (CP) of a PUSCH symbol to be transmitted after $T_{proc,2}$ from the last time of the PDCCH including scheduling grant starts. $T_{proc,2}$ may be calculated as in Equation 3.

$$T_{proc,2} = ((N_2 + d_{2,1})(2048 + 144) \cdot \kappa 2^{-\mu}) \cdot T_C \quad \text{Equation 3}$$

In Equation 3 above, N2, d2,1, κ, μ, and TC may be defined as follows.

When a first symbol among PUSCH-allocated symbols includes only DMRS, d2,1=0, otherwise d2,1=1.

When the terminal receives multiple activated configuration carriers or carriers, the maximum timing difference between carriers may be reflected to second signal transmission.

N2 is defined as in Table 10 according to μ. μ=0, 1, 2, and 3 mean subcarrier spacing of 15 kHz, 30 kHz, 60 kHz, and 120 kHz, respectively.

TABLE 10

| μ | PUSCH preparation time $N_2$ [symbols] |
|---|---|
| 0 | 10 |
| 1 | 12 |
| 2 | 23 |
| 3 | 36 |

For the N2 value provided in Table 10 above, a different value may be used according to UE capability.

$T_c$, $\Delta f_{max}$, $N_f$, $\kappa$, $T_s$, $\Delta f_{ref}$, and $N_{f,ref}$ may be defined as follows:

$$T_c = 1/(\Delta f_{max} \cdot N_f),\ \Delta f_{max} = 480.10^3 \text{ Hz},$$

$$N_f = 4096,\ \kappa = T_s/T_c = 64,\ T_s = 1/(\Delta f_{ref} \cdot N_{f,ref}),$$

$$\Delta f_{ref} = 15.10^3 \text{ Hz},\ N_{f,ref} = 2048$$

The 5G or NR system may configure a frequency band part (BWP) within one carrier to designate to transmit and receive within the BWP in which a specific terminal is configured. This may be aimed at reducing power consumption of the terminal. The base station may configure multiple BWPs, and change an activated BWP in control information. A time that may be used by the terminal for changing the BWP may be defined as in Table 11 below.

TABLE 11

| Frequency Range | Scenario | Type 1 delay (us) | Type 2 delay (us) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 11, frequency range 1 means a frequency band of 6 GHz or less, and frequency range 2 means a frequency band of 6 GHz or more. In the above-described embodiment, type 1 and type 2 may be determined according to UE capability. Scenarios 1, 2, 3, and 4 in the above-described embodiment are given as illustrated in Table 12 below.

TABLE 12

| | Center frequency change | Center frequency constant |
|---|---|---|
| Frequency bandwidth change | Scenario 3 | Scenario 2 |
| Frequency bandwidth constant | Scenario 1 | Scenario 4 when subcarrier spacing is changed |

Figure 4A:
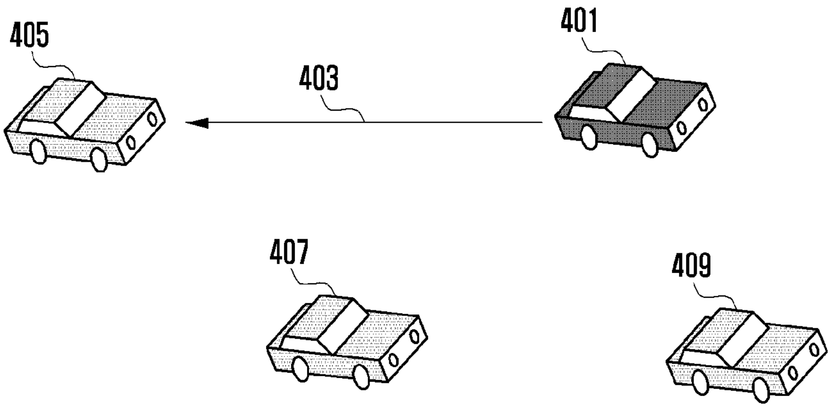
FIG. 4A illustrates an example in which one-to-one communication between two terminals, that is, unicast communication, is performed through a sidelink.

FIG. 4A illustrates an example in which one-to-one communication between two terminals, that is, unicast communication, is performed through a sidelink.

FIG. 4A illustrates an example in which a signal 403 is transmitted from a first terminal 401 to a second terminal 405, and the direction of signal transmission may be reversed. That is, a signal may be transmitted from the second terminal 405 to the first terminal 401. Terminals 407 and 409 other than the first terminal 401 and the second terminal 405 may not receive signals exchanged through unicast communication between the first terminal 401 and the second terminal 405. The exchange of signals through the unicast communication between the first terminal 401 and the second terminal 405 may be performed through mapping in a promised resource between the first terminal 401 and the second terminal 405, or may be performed through a process of scrambling using a value promised therebetween, mapping of control information, data transmission using mutually configured values, and identifying unique ID values with each other. The terminal may be a mobile terminal such as a vehicle. For the unicast communication, separate control information, physical control channels, and data may be transmitted.

Figure 4B:
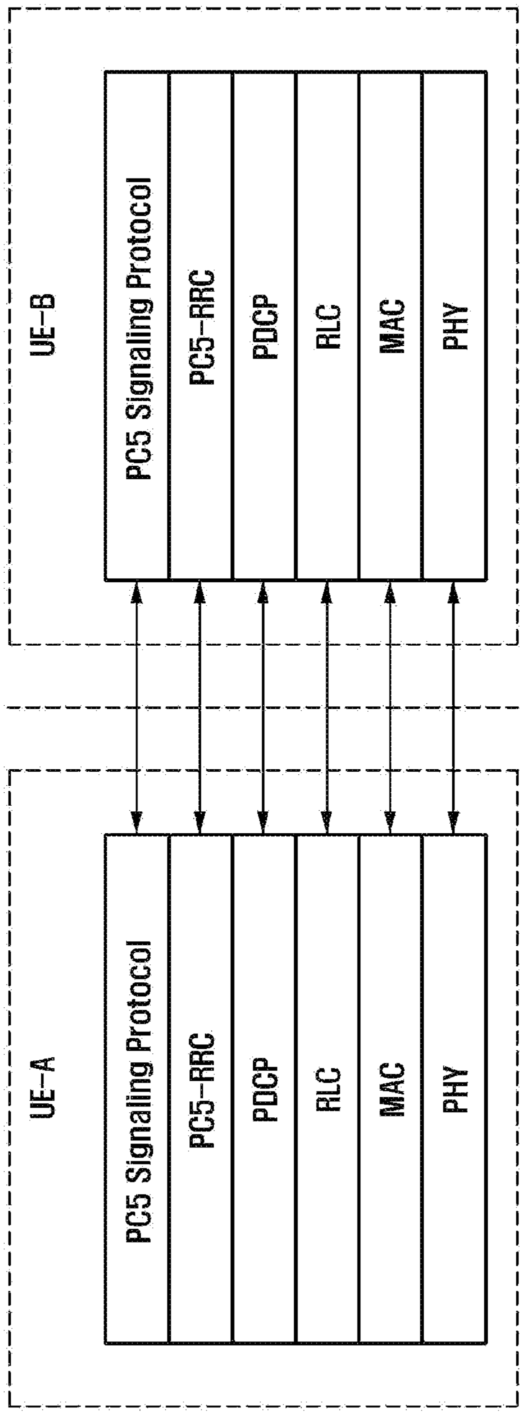
FIG. 4B illustrates an embodiment for a protocol of a sidelink terminal to which an embodiment of the disclosure is applied.

FIG. 4B illustrates an embodiment for a protocol of a sidelink terminal to which an embodiment of the disclosure is applied.

Although not illustrated in FIG. 4B, application layers of terminal-A and terminal-B may perform service discovery. In this case, the service discovery may include discovery of a sidelink communication scheme (unicast, groupcast, or broadcast) which will be performed by each terminal. Therefore, in FIG. 4B, it may be assumed that terminal-A and terminal-B have recognized to perform a unicast communication scheme via a service discovery procedure performed in the application layers. The sidelink terminals may acquire information on a transmitter ID (source identifier) and a destination ID (destination identifier) for sidelink communication from the above-described service discovery procedure.

When the above-described procedure is completed, the PC5 signaling protocol layer illustrated in FIG. 4B may perform a D2D direct link connection setup procedure. In this case, security configuration information for D2D direct communication may be exchanged. When the D2D direct link connection setup is completed, a D2D PC5 radio resource control (RRC) configuration procedure may be performed in the PC5 RRC layer of FIG. 4B. In this case, information on the capabilities of terminal-A and terminal-B may be exchanged, and access stratum (AS) layer parameter information for unicast communication may be exchanged.

When the PC5 RRC configuration procedure is completed, terminal-A and terminal-B may perform unicast communication.

In the above example, unicast communication is described as an example, but it may be extended to groupcast communication. For example, when terminal-A, terminal-B, and terminal-C that is not illustrated in FIG. 4B perform groupcast communication, as mentioned above, terminal-A and terminal-B may perform D2D direct link setup, a PC5 RRC configuration procedure, and service discovery for unicast communication. Furthermore, terminal-A and terminal-C may also perform the D2D direct link setup, the PC5 RRC setup procedure, and the service discovery for unicast communication. Finally, terminal-B and terminal-C may perform the D2D direct link setup, the PC5 RRC setup procedure, and the service discovery for unicast communication. That is, instead of performing a separate PC5 RRC configuration procedure for groupcast communication, a PC5 RRC configuration procedure for unicast communication may be performed by each pair of a transmission terminal and a reception terminal participating in groupcast communication.

Figure 5:
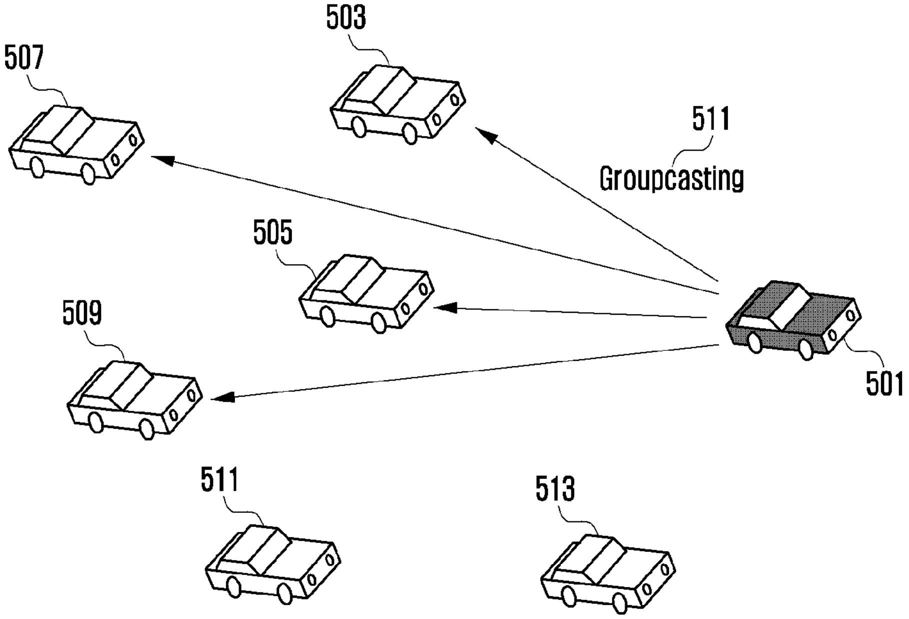
FIG. 5 illustrates groupcast communication in which one terminal transmits common data to multiple terminals through a sidelink, in relation to the disclosure.

FIG. 5 illustrates groupcast communication in which one terminal transmits common data to multiple terminals through a sidelink, in relation to the disclosure.

In FIG. 5, an example, in which a first terminal 501 transmits a signal 511 to other terminals 503, 505, 507, and 509 in a group, is illustrated, and other terminals 511 and 513 that are not included in the group may not receive signals transmitted for groupcast communication.

A terminal for transmitting a signal for the groupcast communication may correspond to another terminal in the group, and resource allocation for signal transmission may be provided by a base station or a terminal serving as a leader in the group, or may be selected by the terminal itself which has transmitted the signal. The terminal may be a mobile terminal such as a vehicle. Separate control information, physical control channels, and data may be transmitted for the groupcasting.

Figure 6:
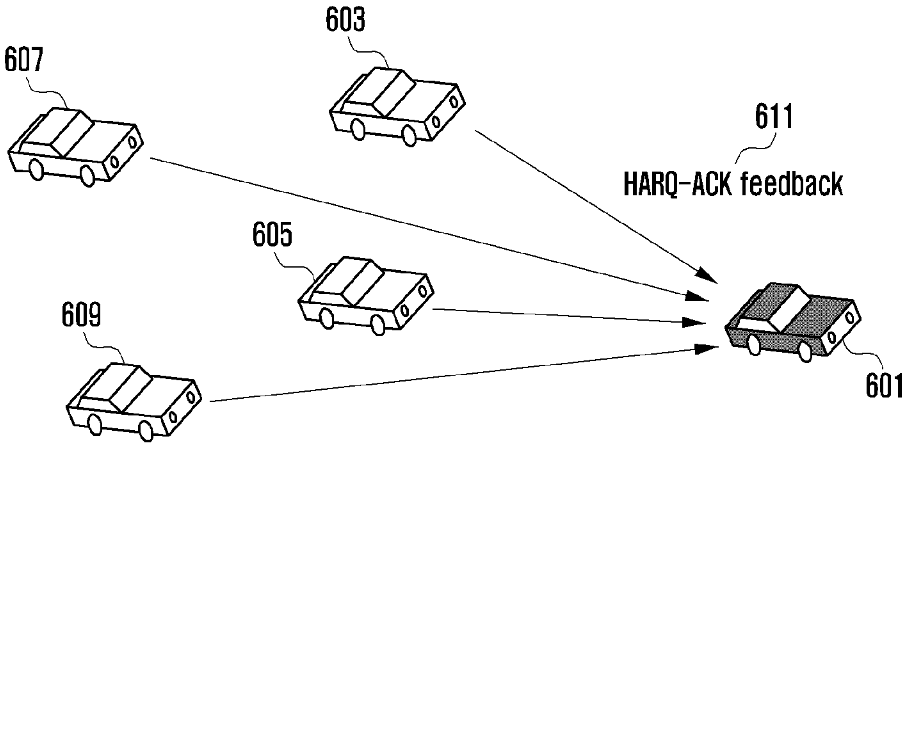
FIG. 6 illustrates a process in which terminals having received common data through groupcasting transmit information related to success or failure of reception of data to a terminal having transmitted data, in relation to the disclosure.

FIG. 6 illustrates a process in which terminals 603, 605, 607, and 609 having received common data through groupcasting transmit information related to success or failure of reception of data to a terminal 601 having transmitted data, in relation to the disclosure.

The information may be information such as HARQ-ACK feedback (611). In addition, the terminals may be terminals having an LTE-based sidelink function or an NR-based sidelink function. If a terminal has only an LTE-based sidelink function, it may be impossible for the terminal to transmit or receive an NR-based sidelink signal and an NR-based physical channel. In the disclosure, the sidelink may be interchangeably used with PC5, V2X, or device to device (D2D). FIGS. 5 and 6 illustrate an example of transmission or reception according to groupcasting, but the descriptions may also be applied to unicast signal transmission or reception between terminals.

Figure 7:
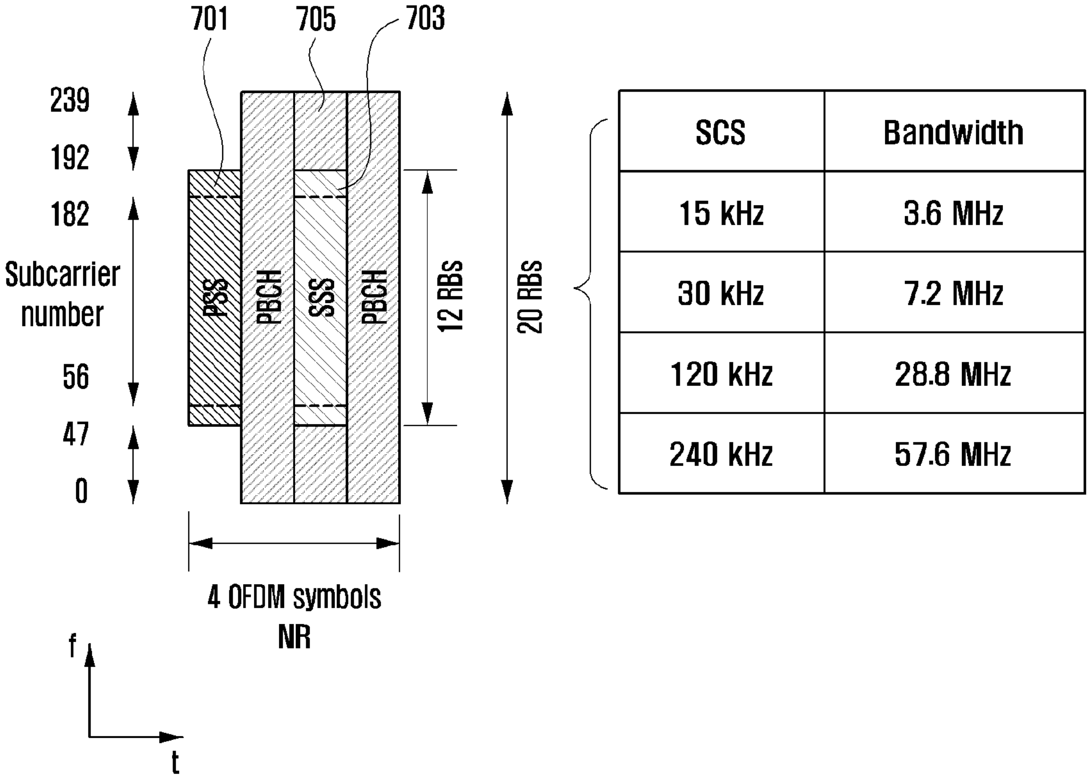
FIG. 7 illustrates an aspect in which a synchronization signal (SS) and a physical broadcast channel (PBCH) of an NR system are mapped in a frequency and a time domain in an NR system related to the disclosure.

FIG. 7 illustrates an aspect in which a synchronization signal (SS) and a physical broadcast channel (PBCH) of an NR system are mapped in a frequency and a time domain, in relation to the disclosure. A primary synchronization signal (PSS) 701, a secondary synchronization signal (SSS) 703, and the PBCH 705 are mapped over four OFDM symbols, the PSS and the SSS are mapped to 12 RBs, and the PBCH is mapped to 20 RBs. The table in FIG. 7 shows frequency bands of 20 RBs which change according to a subcarrier spacing (SCS). A resource domain in which the PSS, the SSS, and the PBCH are transmitted may be called an SS/PBCH block. In addition, the SS/PBCH block may be referred to as an SS block (SSB).

FIG. 8 is illustrated above in relation to the TA, and thus, a detailed description thereof will be omitted.

Figure 9:
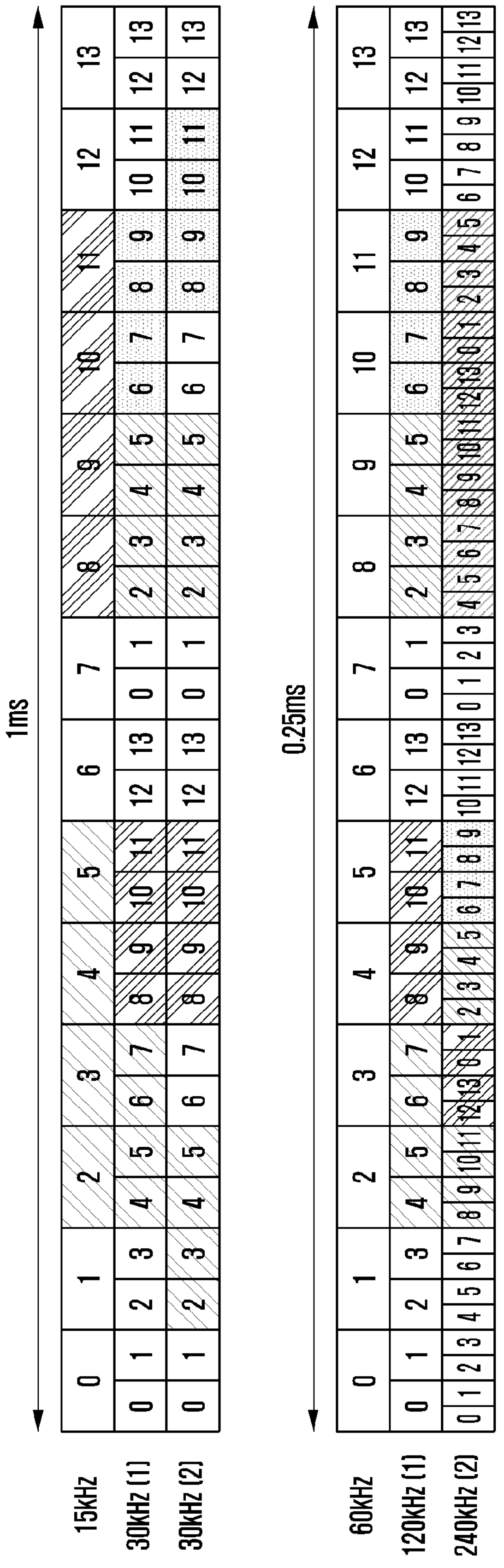
FIG. 9 illustrates a symbol to which an SS/PBCH block is to be transmitted according to a subcarrier spacing, in relation to the disclosure.

FIG. 9 illustrates a symbol to which an SS/PBCH block is to be transmitted according to a subcarrier spacing, in relation to the disclosure.

Referring to an upper end in FIG. 9, the subcarrier spacing may be configured as 15 kHz, 30 kHz, and the like, and the position of a symbol, in which the SS/PBCH block (or SSB) may be positioned, may be determined according to each subcarrier spacing. The upper end of FIG. 9 shows the position of a symbol through which an SSB can be transmitted according to a subcarrier spacing in symbols within 1 ms, and the SSB in the region shown in the upper end of FIG. 9 is not always required to be transmitted. Accordingly, the position where the SSB block is transmitted may be configured for the terminal through system information or dedicated signaling.

Referring to a lower end of FIG. 9, the subcarrier spacing may be configured as 60 kHz, 120 kHz, 240 kHz, and the like, and the position of a symbol, in which the SS/PBCH block (or SSB block) may be positioned, may be determined according to each subcarrier spacing. The lower end of FIG. 9 shows the position of a symbol through which an SSB block can be transmitted according to a subcarrier spacing in symbols within 5 ms, and the position where the SSB block is transmitted may be configured for a terminal through system information or dedicated signaling. In a region where the SS/PBCH block can be transmitted, the SS/PBCH block is not always required to be transmitted, and may or may not be transmitted depending on the selection of the base station. Accordingly, the position where the SSB block is transmitted may be configured for the terminal through system information or dedicated signaling.

Figure 10:
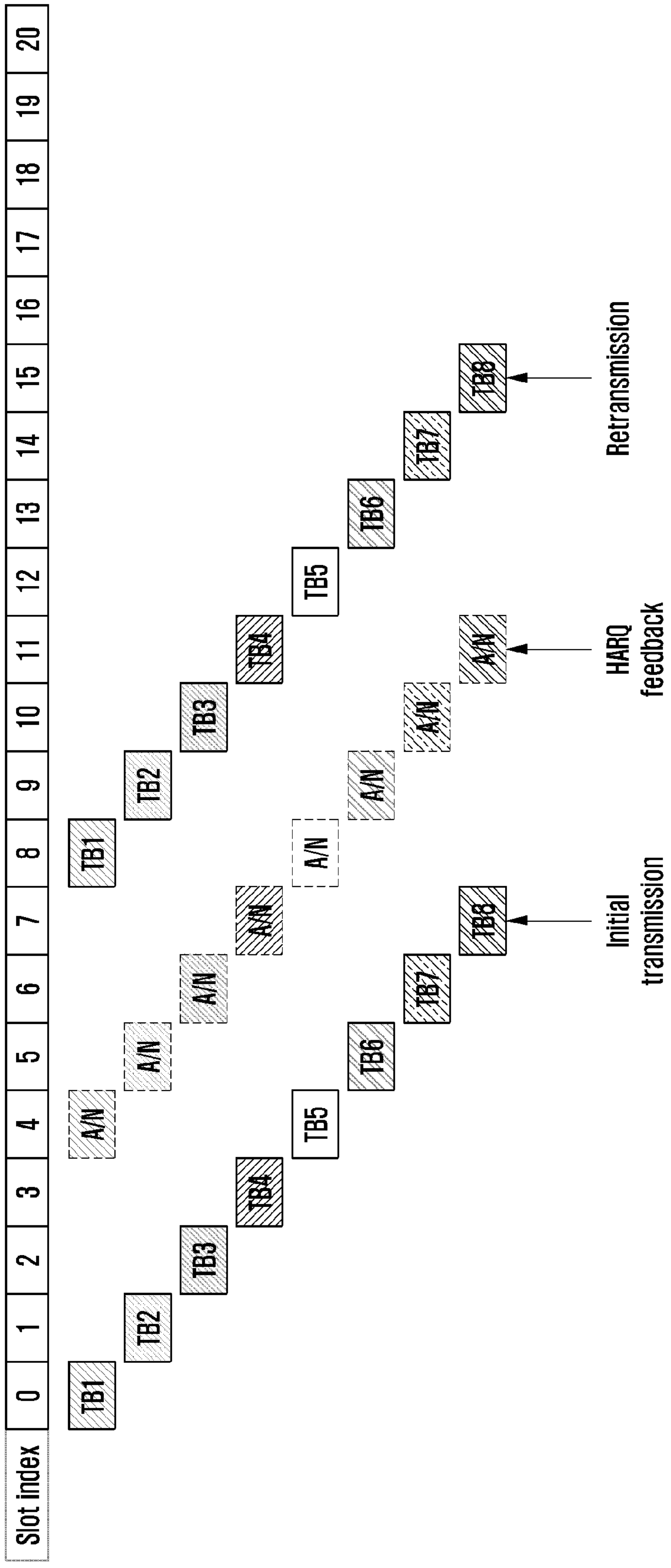
FIG. 10 illustrates a process in which a transmission terminal performs scheduling of data (for example, TBs) according to slots, receives HARQ-ACK feedback for the corresponding data, and performs retransmission according to the feedback, in relation to the disclosure.

FIG. 10 illustrates a process in which a transmission terminal performs scheduling of data (for example, TBs) according to slots, receives HARQ-ACK feedback for the corresponding data, and performs retransmission according to the feedback.

FIG. 10 illustrates an example in which a base station performs scheduling of data (for example, TBs) according to slots, receives HARQ-ACK feedback for the corresponding data from the terminal, and performs retransmission to the terminal according to the feedback. In FIG. 10, TB1 is initially transmitted in slot 0, and ACK/NACK feedback thereof is transmitted in slot 4. When initial transmission of TB1 fails and a NACK is received, retransmission for TB1 may be performed in slot 8. In the above description, a timing at which ACK/NACK feedback is transmitted and a timing at which the retransmission is performed may be predetermined, but may be determined according to a value indicated by control information. FIG. 10 illustrates an example in which TB1 to TB8 are sequentially scheduled and transmitted according to a slot from a slot 0. For example, HARQ process IDs 0 to 7 may be assigned to TB1 to TB8, respectively and transmitted. When the number of HARQ process IDs usable by the base station and the terminal is only four, it may not be possible to consecutively transmit eight different TBs.

Figure 11:
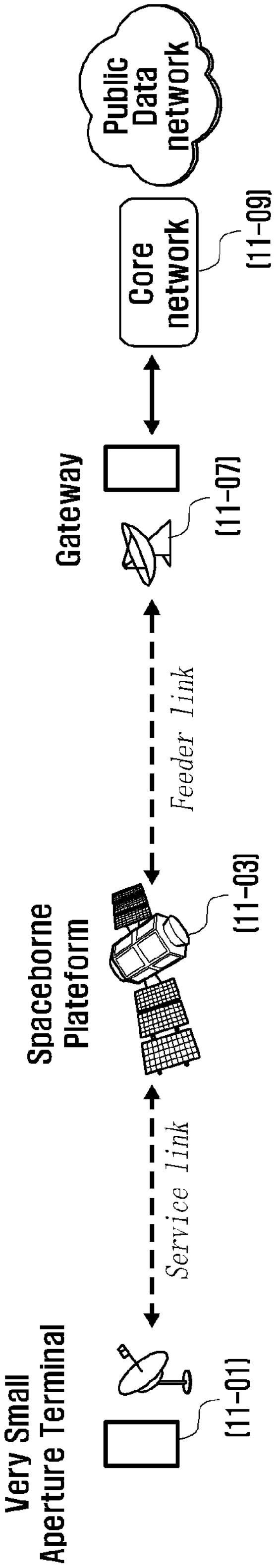
FIG. 11 illustrates an example of a communication system using a satellite, in relation to the disclosure.

FIG. 11 illustrates an example of a communication system using a satellite, in relation to the disclosure. For example, when a terminal 11-01 transmits a signal to a satellite 11-03, the satellite 11-03 transfers the signal to a base station 11-07, and the base station 11-07 and a core network 11-09 process the received signal to transmit requirements for a subsequent operation thereof to the terminal 11-01, wherein the requirements may be again transmitted through the satellite 11-03. In the above description, because a distance between the terminal 11-01 and the satellite 11-03 is long and a distance between the satellite 11-03 and the base station 11-07 is also long, a time required for data transmission and reception from the terminal 11-01 to the base station 11-07 will be longer.

Figure 12:
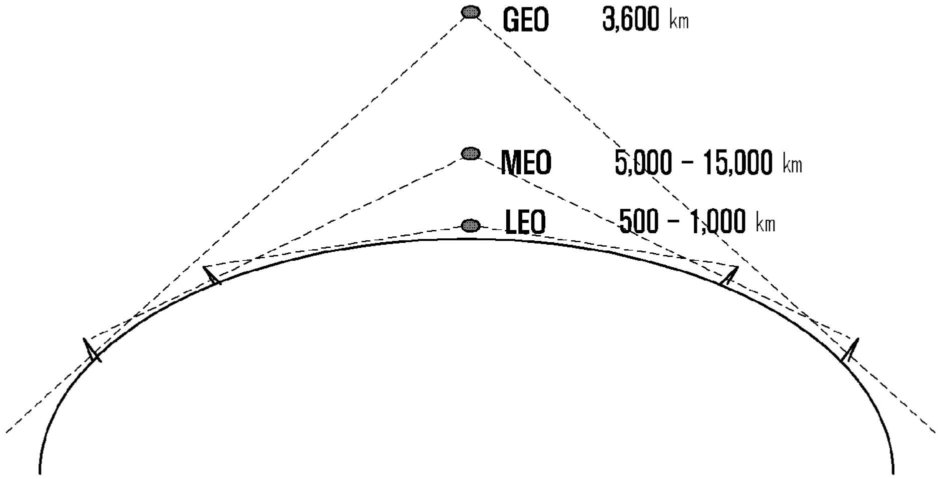
FIG. 12 illustrates an Earth orbital period of a communication satellite according to an altitude or height of the satellite, in relation to the disclosure.

FIG. 12 illustrates an Earth orbital period of a communication satellite according to an altitude or height of the satellite, in relation to the disclosure. Satellites for communication may be classified into a low Earth orbit (LEO), a middle Earth orbit (MEO), a geostationary Earth orbit (GEO), etc., according to the orbit of the satellite.

Figure 13:
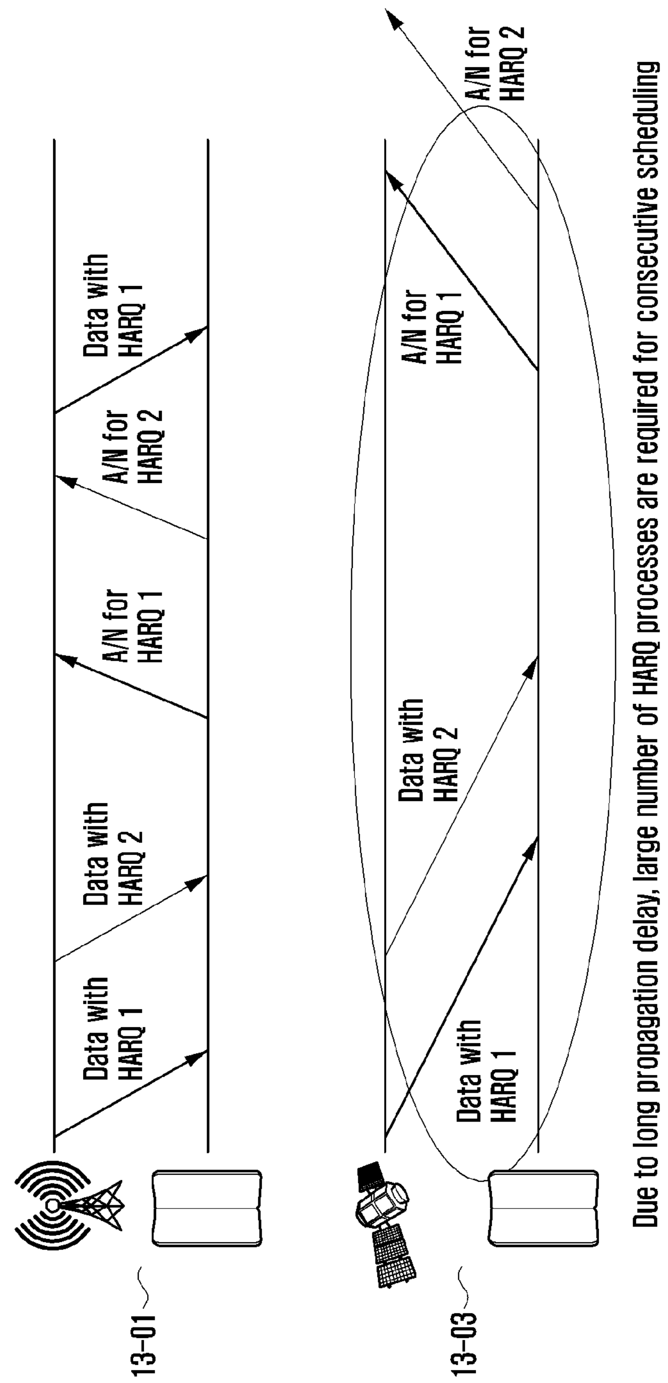
FIG. 13 illustrates an example of transmitting data from a base station to a terminal, and transmitting acknowledgment (ACK)/negative ACK (NACK) feedback of the corresponding data from the terminal to the base station, in relation of the disclosure.

FIG. 13 illustrates an example of transmitting data from a base station to a terminal, and transmitting ACK/NACK feedback of the corresponding data from the terminal to the base station, in relation of the disclosure, a case of the lower 13-03 of FIG. 13 may be a case where a propagation delay time is longer than that in a case of the upper end 13-01 of FIG. 13, and accordingly, time for transferring the ACK/NACK feedback from the terminal to the base station is delayed, which may finally lead to a delay in a retransmission time point. The case of satellite communication illustrated in FIG. 11 may be a case where a delay time is long as in the case of the lower end 13-03 of FIG. 13. As shown in the case of the lower end 13-03 of FIG. 13, when the propagation delay time is long, a large number of HARQ process IDs may be required to consecutively schedule and transmit other data.

The disclosure describes a method and apparatus for efficiently operating HARQ process IDs when a large number of HARQ process IDs are operated in a situation in which a delay time is long as in the case of a non-terrestrial network (NTN).

First Embodiment

A first embodiment provides a method and apparatus for efficiently transferring HARQ process ID.

Figure 14:
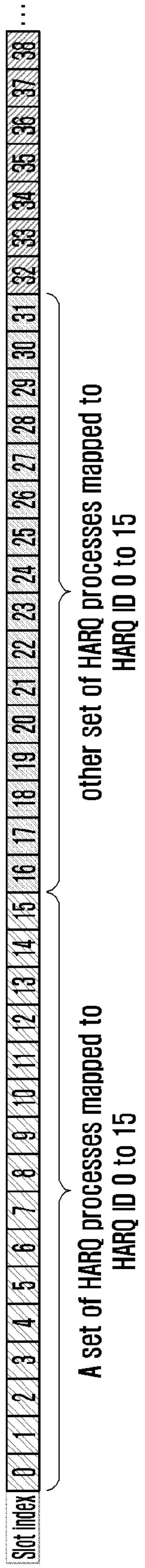
FIG. 14 illustrates an example of when a large number of HARQ processes are required, distinguishing HARQ processes by respective ID values according to a time interval, in relation to the disclosure.

FIG. 14 illustrates an example of when a large number of HARQ processes are required, distinguishing HARQ processes by respective ID values according to a time interval. As in the illustrated embodiment, the base station assigns, to slots 0 to slot 15, IDs 0 to 15 of HARQ processes corresponding to one set, among all HARQ processes. In addition, the base station assigns, to slot 16 to slot 31, IDs 0 to 15 of HARQ processes corresponding to another set, among all HARQ processes. The ID values assigned to the HARQ processes corresponding to slot 0 to slot 15 may be identical to the ID values assigned to the HARQ processes corresponding to slot 16 to slot 31. However, two slots corresponding to the same ID may correspond to different HARQ processes, and may be divided according to a slot index. That is, the base station and the terminal may distinguish the HARQ processes by a combination of an ID value and a slot index. For example, when the base station performs downlink data transmission and transmits control information, 4-bit HARQ process ID information may be transferred via the corresponding control information. In the situation in FIG. 14, for example, when the base station transfers HARQ process IDs to the terminal four times, the terminal may determine that data corresponding to one of two HARQ processes having HARQ process ID 4 is transmitted. Selecting one of the two HARQ processes may be determined whether an index of a currently transmitted slot is included in the range between 0 and 15, or in the range between 16 and 31.

Figure 15:
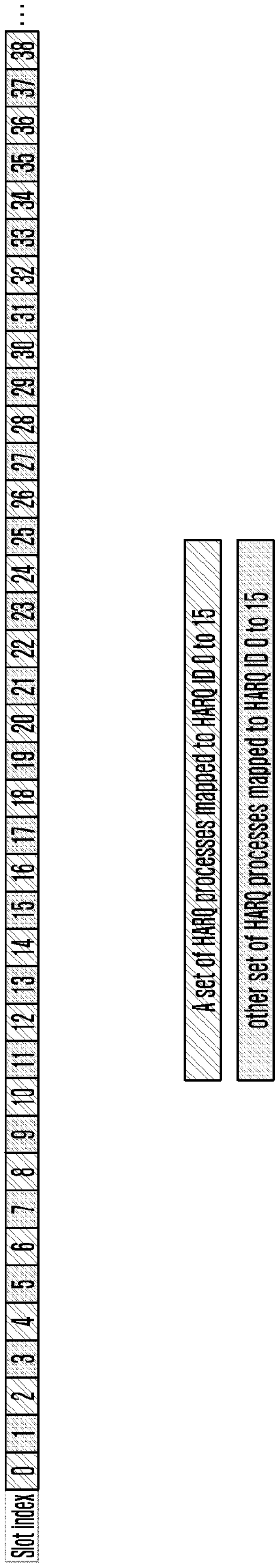
FIG. 15 illustrates another example in which HARQ processes are distinguished between a base station and terminals by a combination of an ID value and a slot index, in relation to the disclosure.

FIG. 15 illustrates another example in which HARQ processes are distinguished between a base station and terminals by a combination of an ID value and a slot index. FIG. 15 shows a method for dividing slots into two groups (or sets) according to whether a slot number is an odd number or an even number, and assigning HARQ IDs of 0 to 15 to each of the groups. In a situation of FIG. 15, for example, when the base station transfers IDs to the terminal four times, the terminal may determine that data corresponding to one of two HARQ processes having ID 4 is transmitted. Selecting one of the two HARQ processes may be determined according to whether an index of a currently transmitted slot is included in {0, 2, 4, 6, 8, 10, 12, 14, 16, 18, 20, 22, 24, 26, 28, 30, 32, 34, 36, 38, . . . } or {1, 3, 5, 7, 9, 11, 13, 15, 17, 19, 21, 23, 25, 27, 29, 31, 33, 35, 37, . . . }.

That is, the method in FIG. 15 may be a method in which the terminal determines a HARQ process corresponding to transmitted data, based on a combination of an ID value transferred from physical layer control information (for example, control information such as DCI, sidelink control information, or SCI) and an index of a slot on which the control information or data is transmitted.

Second Embodiment

A second embodiment provides a method and apparatus for providing HARQ process ID via control information.

Figure 16:
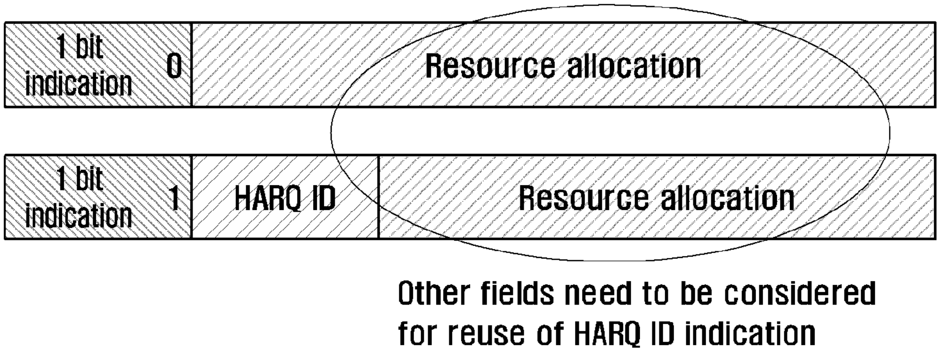
FIG. 16 illustrates an example in which a HARQ ID value is transferred according to 1 bit included in physical layer control information, in relation to the disclosure.

FIG. 16 illustrates a method in which a HARQ ID value can be transferred via control information according to 1 bit included in physical layer control information (i.e., DCI). For example, when a 1-bit indicator value is 1, the terminal and the base station may interpret a part or the entirety of a specific bitfield as a HARQ ID value. FIG. 16 illustrates an example of interpreting a part of a resource allocation bitfield as a HARQ ID value. In this method, when the 1-bit indicator value is 0, the HARQ ID value may be determined based on a slot index. For example, in a case where the 1-bit indicator value is 0 and the slot index is Ns, the HARQ ID value may be determined according to Equation 4 below.

$$HARQ\ ID = \mathrm{mod}\left(N_s, N_{HARQ}^{total}\right) \quad \text{Equation 4}$$

In the above equation, $$N_{HARQ}^{total}$$

is a total number of HARQ processes, wherein the value may be a configured value. When this embodiment is applied to sidelink transmission, $$N_{HARQ}^{total}$$

may be a value configured according to a resource pool.

Alternatively, it may be configured whether the HARQ process is to be determined according to Equation 4 via higher-layer signaling without the 1-bit indicator, or whether to perform transmission by including the HARQ process ID in the control information.

Conversely, when the 1-bit indicator value is 0, a part of the resource allocation bitfield may be interpreted as a HARQ ID to determine the HARQ ID value. Alternatively, the HARQ ID value may be determined and interpreted based on a combination of a slot index and a part of the resource allocation bitfield. A method of using a part of the resource allocation bitfield is described above, but the disclosure is not limited, and it may be possible to use a part of various other bitfields.

When downlink and uplink data is transmitted, a base station may determine a 1-bit indicator value of control information as shown above according to the method of determining the HARQ process ID, and transmit the same. When the downlink and uplink data is transmitted, the terminal may interpret the 1-bit indicator value from the received control information to determine the HARQ process ID. Accordingly, the terminal and the base station may perform a data reception operation and a data transmission operation. In a case of transmission of a sidelink corresponding to a communication link between terminals, a transmission terminal may determine the 1-bit indicator value of the control information according to the method for determining the HARQ process ID by the base station above, so as to transmit the same.

Third Embodiment

A third embodiment provides a method and apparatus for efficiently transferring HARQ process ID information.

The base station may configure a set of slot indices in a radio frame (for example, 10 ms unit) for the terminal. In the configuration of the set, the base station may divide a set of slot indices in a radio frame (for example, 10 ms unit) into two sets, and explicitly configure the sets for the terminal via higher-layer signaling (for example, RRC signaling or a MAC CE). Alternatively, the base station may configure one set (hereafter, referred to as a first slot set) of slot index values via higher-layer signaling, and the base station and the terminal may implicitly consider that slot indices that are not configured are automatically included in another set (for example, a second slot set). For example, the base station may configure, for the terminal, slot indices {0,1,2,3,4,10, 11,12,13,14} as the first slot set, and may explicitly configure slot indices {5,6,7,8,9,15,16,17,18,19} as the second slot set. Alternatively, the base station may configure slot indices {0,1,2,3,4,10,11,12,13,14} as the first slot set for the terminal, and the base station and the terminal may implicitly consider that the slot indices {5,6,7,8,9,15,16,17,18,19} that are not included in the first slot set as the second slot set.

The base station may configure, for the terminal via higher-layer signaling, a set (a first HARQ process set) of HARQ process IDs to be applied in the slot indices of the first slot set. In addition, the base station may configure, for the terminal via higher-layer signaling, a set (a second HARQ process set) of HARQ process IDs to be applied in the slot indices of the second slot set. Alternatively, the base station and the terminal may consider the HARQ process IDs to be applied in the slot indices of the second slot set as remaining HARQ process IDs that are not included in the first HARQ process set, and may consider the remaining HARQ process IDs as a second HARQ process set. In the description above, the remaining HARQ process IDs may be determined based on a total number of HARQ processes configured for the terminal by the base station. For example, when the base station configures a total of 32 HARQ processes for the terminal, the base station may configure, for the terminal, HARQ process IDs {0,1,2,3,4,5,6,7,8, . . . ,13,14,15} to be used in the first slot set, as a first HARQ process set, and the base station may configure, for the terminal, HARQ process IDs {16,17,18,19,20, . . . ,29,30, 31} to be used in the first slot set, as a second HARQ process set.

The base station may also configure the number of HARQ processes for the terminal. For example, the base station may configure 16 HARQ processes for the terminal, and in another example, the base station may configure 32 HARQ processes. In such an embodiment, the HARQ process ID may be determined based on a slot index, a HARQ process ID bitfield in DCI, and the number of HARQ processes configured for the terminal by the base station. For example, when the base station configures no more than 16 HARQ processes for the terminal, the HARQ process ID may be determined by the DCI of the HARQ process ID bitfield. That is, when the base station configures no more than 16 HARQ processes for the terminal, the HARQ process ID may be a HARQ process ID bitfield of the DCI. In addition, when the base station configures more than 16 HARQ processes, the HARQ process ID may be determined by a slot index value and the HARQ process ID filed of the DCI. For example, when the slot index is N, N mod 2=X, and when the HARQ process ID bitfield value of the DCI is Y, the HARQ process ID may be determined according to 2*Y+X, or may be determined according to 16*X+Y. Each of the base station and the terminal may determine the HARQ process ID according to the method above.

For convenience of description, the first embodiment, the second embodiment, and the third embodiment of the disclosure are divided and described, but each embodiment includes operations related to each other, and thus, a combination of some or all of two or more embodiments may be available.

Figure 17:
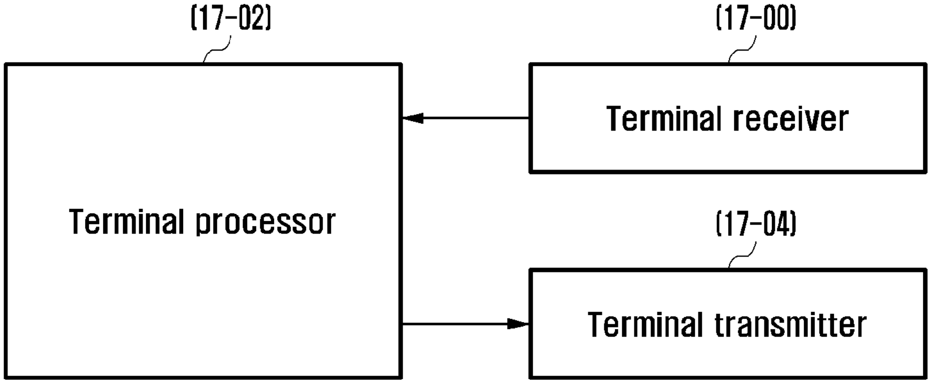
FIG. 17 illustrates a structure of a terminal related to the disclosure.
Figure 18:
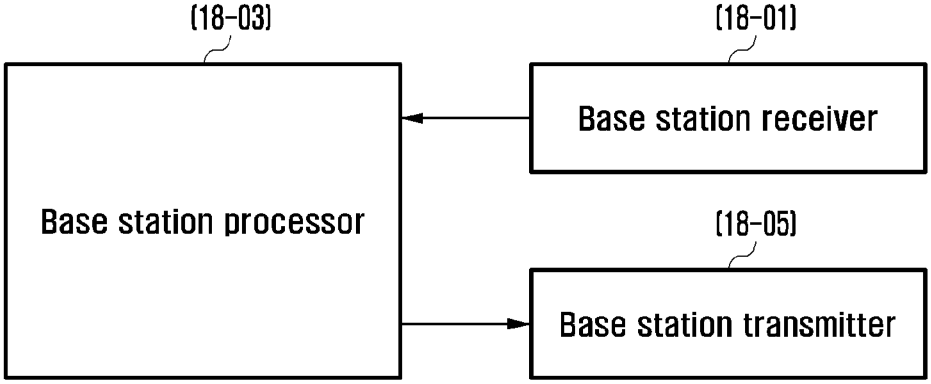
FIG. 18 illustrates a structure of a base station related to the disclosure.

In order to perform the above-described embodiments of the disclosure, transmitters, receivers, and processors of a terminal and a base station are illustrated in FIGS. 17 and 18, respectively. In order to perform the operations in the first embodiment, the second embodiment, and the third embodiment, a method for transmission or reception between a base station and a terminal or a method for transmission or reception between a transmission terminal and a reception terminal is shown, and in order to perform the method, the receivers, the processors, and the transmitters of the base station and the terminal need to operate according to each of the embodiments.

Specifically, FIG. 17 is a block diagram illustrating an internal structure of a terminal according to an embodiment of the disclosure. As illustrated in FIG. 17, a terminal of the disclosure may include a terminal receiver 17-00, a terminal transmitter 17-04, and a terminal processor 17-02. The terminal receiver 17-00 and the terminal transmitter 17-04 may be collectively referred to as a transceiver in an embodiment of the disclosure. The transceiver may transmit or receive a signal to or from a base station. The signal may include control information and data. To this end, the transceiver may include a radio frequency (RF) transmitter configured to up-convert and amplify the frequency of a transmitted signal, a RF receiver configured to perform low-noise amplification of a received signal and down-convert the frequency of the signal, and the like. The transceiver may receive a signal through a radio channel, then output the received signal to the terminal processor 17-02, and transmit a signal output from the terminal processor 17-02, through a radio channel. The terminal processor 17-02 may control a series of procedures to allow the terminal to be operated according to the above-described embodiments of the disclosure. For example, the terminal receiver 17-00 may receive control information from the base station via a downlink, and the terminal processor 17-02 may determine a HARQ ID, etc., according to the control information, and may prepare transmission and reception accordingly. Thereafter, the terminal processor 17-02 may transfer data scheduled in the terminal transmitter 17-04 to the base station.

FIG. 18 is a diagram illustrating an internal structure of a base station according to an embodiment of the disclosure. As illustrated in FIG. 18, a base station of the disclosure may include a base station receiver 18-01, a base station transmitter 18-05, and a base station processor 18-03. The base station receiver 18-01 and the base station transmitter 18-05 may be collectively referred to as a transceiver in an embodiment of the disclosure. The transceiver may transmit or receive a signal to or from a terminal. The signal may include control information and data. To this end, the transceiver may include a RF transmitter configured to up-convert and amplify the frequency of a transmitted signal, a RF receiver configured to perform low-noise amplification on a received signal and down-convert the frequency of the signal, and the like. In addition, the transceiver may receive a signal through a radio channel, then output the received signal to the base station processor 18-03, and transmit a signal output from the base station processor 18-03 through a radio channel. The base station processor 18-03 may control a series of procedures to allow the base station to be operated according to the above-described embodiments of the disclosure. For example, the base station processor 18-03 may transmit a downlink control signal to the terminal as necessary according to configuration information configured by the base station processor itself. Thereafter, the base station transmitter 18-05 transmits the related scheduling control information and data, and the base station receiver 18-01 receives feedback information from the terminal.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. Further, other variants of the above embodiments, based on the technical idea of the embodiments, may also be implemented in other systems such as LTE and 5G systems.

The invention claimed is:

1. A method performed by a terminal in a wireless communication system, the method comprising:

receiving, from a base station, a first control message including downlink control information (DCI) which schedules data transmission, the DCI including an indicator indicating a determination rule of a hybrid automatic repeat request (HARQ) process ID and a HARQ process ID field;

determining the HARQ process ID based on the indicator and the HARQ process ID field;

determining a HARQ process corresponding to the data transmission, based on a combination of the HARQ process ID and a slot index of a slot in which the first control message is received; and transmitting, to the base station, a response to the data transmission according to the HARQ process, wherein in case that the indicator is set to a first value, the HARQ process ID is determined as a value in the HARQ process ID field, wherein in case that the indicator is set to a second value, the HARQ process ID is determined based on the slot index and the value in the HARQ process ID field, and wherein the HARQ process is determined, among two or more different HARQ processes corresponding to the same HARQ process ID based on the slot index.

2. The method of claim 1, further comprising:

receiving, from the base station, a second control message which configures a slot index set; and determining, as the HARQ process corresponding to the data transmission, a HARQ process corresponding to a slot index set, to which the slot index belongs, among two or more slot index sets based on the second control message.

3. The method of claim 1, further comprising:

receiving, from the base station, a third control message which configures a number of HARQ processes, wherein the determining of the HARQ process is further based on whether the number of the HARQ processes is equal to or greater than a predetermined value.

4. A method performed by a base station in a wireless communication system, the method comprising:

transmitting, to a terminal, a first control message including downlink control information (DCI) which schedules data transmission, the DCI including an indicator indicating a determination rule of a hybrid automatic repeat request (HARQ) process ID and a HARQ process ID field; and receiving, from the terminal, a response to the data transmission according to a HARQ process based on a combination of the HARQ process ID and a slot index of a slot in which the first control message is transmitted, wherein in case that the indicator is set to a first value, the HARQ process ID is determined as a value in the HARQ process ID field, wherein in case that the indicator is set to a second value, the HARQ process ID is determined based on the slot index and the value in the HARQ process ID field, and wherein the HARQ process is determined among two or more different HARQ processes corresponding to the same HARQ process ID based on the slot index.

5. The method of claim 4, further comprising:

transmitting, to the terminal, a second control message which configures a slot index set, and determining, as the HARQ process corresponding to the data transmission, a HARQ process corresponding to a slot index set, to which the slot index belongs, among two or more slot index sets based on the second control message.

6. The method of claim 4, further comprising:

transmitting, to the terminal, a third control message which configures a number of HARQ processes wherein the HARQ process is determined based on the indicator, the slot index, and whether the number of the HARQ processes is equal to or greater than a predetermined value.

7. A terminal in a wireless communication system, the terminal comprising:

a transceiver configured to transmit and receive a signal; and a controller connected to the transceiver, wherein the controller is configured to:

receive, from a base station, a first control message including downlink control information (DCI) which schedules data transmission, the DCI including an indicator indicating a determination rule of a hybrid automatic repeat request (HARQ) process ID and a HARQ process ID field, determine the HARQ process ID based on the indicator and the HARQ process ID field, determine a HARQ process corresponding to the data transmission, based on a combination of the HARQ process ID and a slot index of a slot in which the first control message is received, and transmit, to the base station, a response to the data transmission according to the HARQ process, wherein in case that the indicator is set to a first value, the HARQ process ID is determined as a value in the HARQ process ID field, wherein in case that the indicator is set to a second value, the HARQ process ID is determined based on the slot index and the value in the HARQ process ID field, and wherein the HARQ process is determined among two or more different HARQ processes corresponding to the same HARQ process ID based on the slot index.

8. The terminal of claim 7, wherein the controller is further configured to:

receive, from the base station, a second control message which configures a slot index set, and determine, as the HARQ process corresponding to the data transmission, a HARQ process corresponding to a slot index set, to which the slot index belongs, among two or more slot index sets based on the second control message.

9. The terminal of claim 7, wherein the controller is further configured to receive, from the base station, a third control message which configures a number of HARQ processes, and wherein the determination of the HARQ process is further based on whether the number of the HARQ processes is equal to or greater than a predetermined value.

10. A base station in a wireless communication system, the base station comprising:

a transceiver configured to transmit and receive a signal; and a controller connected to the transceiver, wherein the controller is further configured to:

transmit, to a terminal, a first control message including downlink control information (DCI) which schedules data transmission, the DCI including an indicator indicating a determination rule of a hybrid automatic repeat request (HARQ) process ID and a HARQ process ID field, and receive, from the terminal, a response to the data transmission according to a HARQ process based on a combination of the HARQ process ID and a slot index of a slot in which the first control message is transmitted, wherein in case that the indicator is set to a first value, the HARQ process ID is determined as a value in the HARQ process ID field, wherein in case that the indicator is set to a second value, the HARQ process ID is determined based on the slot index and the value in the HARQ process ID field, and wherein the HARQ process-corresponds to one related to the slot index, is determined among two or more different HARQ processes corresponding to the same HARQ process ID based on the slot index.

11. The base station of claim 10, wherein the controller is further configured to:

transmit, to the terminal, a second control message which configures a slot index set, and determine, as the HARQ process corresponding to the data transmission, a HARQ process corresponding to a slot index set, to which the slot index belongs, among two or more slot index sets based on the second control message.

12. The base station of claim 10, wherein the controller is further configured to: transmit, to the terminal, a third control message which configures a number of HARQ processes, and wherein the HARQ process is determined based on the indicator, the slot index, and whether the number of the HARQ processes is equal to or greater than a predetermined value.

* * * * *